United States Patent
Rafiee et al.

(10) Patent No.: US 12,496,126 B2
(45) Date of Patent: Dec. 16, 2025

(54) TISSUE CUTTING SYSTEMS AND METHODS

(71) Applicant: Transmural Systems LLC, Andover, MA (US)

(72) Inventors: Nasser Rafiee, Andover, MA (US); Morgan House, Andover, MA (US); Mai Le Diep, Andover, MA (US); Biwei MacDonald, Andover, MA (US); Koosha Rafiee, Andover, MA (US)

(73) Assignee: Transmural Systems LLC, Andover, MA (US)

( * ) Notice: Subject to any disclaimer, the term of this patent is extended or adjusted under 35 U.S.C. 154(b) by 0 days.

(21) Appl. No.: 18/390,687

(22) Filed: Dec. 20, 2023

(65) Prior Publication Data

US 2025/0204977 A1   Jun. 26, 2025

Related U.S. Application Data

(63) Continuation of application No. PCT/US2023/084620, filed on Dec. 18, 2023.

(60) Provisional application No. 63/605,856, filed on Dec. 4, 2023, provisional application No. 63/533,271, filed on Aug. 17, 2023, provisional application No. 63/496,566, filed on Apr. 17, 2023, provisional application No. 63/477,317, filed on Dec. 27, 2022.

(51) Int. Cl.
*A61B 18/14* (2006.01)
*A61B 18/00* (2006.01)

(52) U.S. Cl.
CPC ............ *A61B 18/1492* (2013.01); *A61B 2018/00077* (2013.01); *A61B 2018/00166* (2013.01); *A61B 2018/00196* (2013.01); *A61B 2018/00273* (2013.01); *A61B 2018/00601* (2013.01); *A61B 2018/00636* (2013.01); *A61B 2018/00964* (2013.01); *A61B 2018/1412* (2013.01)

(58) Field of Classification Search
CPC .......... A61B 2018/00077; A61B 2018/00166; A61B 2018/00196; A61B 2018/00273; A61B 2018/00601; A61B 2018/00636; A61B 2018/00964; A61B 2018/1412; A61B 18/1492
See application file for complete search history.

(56) References Cited

U.S. PATENT DOCUMENTS

| | | |
|---|---|---|
| 4,493,320 A | 1/1985 | Treat |
| 5,341,807 A | 8/1994 | Nardella |
| 5,417,697 A | 5/1995 | Wilk et al. |

(Continued)

FOREIGN PATENT DOCUMENTS

| | | |
|---|---|---|
| DE | 10037660 A1 | 2/2002 |
| DE | 202010016945 U1 | 3/2011 |

(Continued)

OTHER PUBLICATIONS

Written Opinion mailed Jan. 27, 2022 for International Patent Application No. PCT/US2021/049952.

(Continued)

*Primary Examiner* — Michael F Peffley
*Assistant Examiner* — Bo Ouyang

(57) ABSTRACT

The disclosure provides various embodiments of systems to facilitate the cutting of tissue structures and other tissue structures percutaneously.

19 Claims, 21 Drawing Sheets

(56) References Cited

U.S. PATENT DOCUMENTS

| | | | |
|---|---|---|---|
| 5,599,300 | A | 2/1997 | Weaver et al. |
| 5,807,279 | A | 9/1998 | Viera |
| 6,017,340 | A | 1/2000 | Cassidy et al. |
| 6,050,995 | A | 4/2000 | Durgin |
| 6,068,637 | A | 5/2000 | Popov et al. |
| 6,071,281 | A * | 6/2000 | Burnside ............ A61B 18/1482 606/41 |
| 6,304,776 | B1 * | 10/2001 | Muntermann ..... A61B 18/1206 600/443 |
| 6,501,992 | B1 | 12/2002 | Belden et al. |
| 6,517,551 | B1 | 2/2003 | Driskill |
| 6,533,782 | B2 | 3/2003 | Howell et al. |
| 6,582,425 | B2 | 6/2003 | Simpson |
| 6,695,836 | B1 | 2/2004 | DeMello et al. |
| 7,160,295 | B1 | 1/2007 | Garito et al. |
| 7,303,798 | B2 | 12/2007 | Bavaro et al. |
| 7,455,646 | B2 | 11/2008 | Richardson et al. |
| 8,100,903 | B2 * | 1/2012 | Kennedy, II ...... A61M 25/0136 606/47 |
| 8,827,948 | B2 | 9/2014 | Romo et al. |
| 9,282,993 | B1 | 3/2016 | Cohen et al. |
| 9,345,539 | B2 * | 5/2016 | Yanuma ............. A61B 18/1492 |
| 9,572,666 | B2 | 2/2017 | Basude et al. |
| 9,833,272 | B2 | 12/2017 | Sweeney |
| 9,980,716 | B2 | 5/2018 | Harris et al. |
| 10,792,094 | B2 | 10/2020 | Hrniecek |
| 10,806,509 | B2 * | 10/2020 | Gittard ................... B05D 3/002 |
| 11,337,753 | B2 | 5/2022 | Rafiee et al. |
| 2002/0042611 | A1 | 4/2002 | Sliwa |
| 2002/0095168 | A1 * | 7/2002 | Griego ........... A61B 17/320016 606/167 |
| 2003/0088195 | A1 | 5/2003 | Vardi et al. |
| 2004/0267161 | A1 | 12/2004 | Osborne et al. |
| 2005/0171532 | A1 | 8/2005 | Ciarocca |
| 2005/0203500 | A1 * | 9/2005 | Saadat .................... A61B 90/39 606/27 |
| 2007/0005084 | A1 | 1/2007 | Clague et al. |
| 2007/0083168 | A1 | 4/2007 | Whiting |
| 2007/0197939 | A1 | 8/2007 | Wallace |
| 2007/0293857 | A1 | 12/2007 | Blind et al. |
| 2008/0015409 | A1 | 1/2008 | Barlow et al. |
| 2008/0228209 | A1 | 9/2008 | DeMello et al. |
| 2009/0005637 | A1 * | 1/2009 | Chin .................. A61B 18/1492 600/117 |
| 2010/0057077 | A1 * | 3/2010 | Ducharme ............. A61B 18/14 606/39 |
| 2010/0159396 | A1 | 6/2010 | Specht et al. |
| 2010/0204560 | A1 | 8/2010 | Salahieh |
| 2012/0083781 | A1 | 4/2012 | Schall |
| 2012/0123328 | A1 | 5/2012 | Williams |
| 2012/0259263 | A1 | 10/2012 | Celermajer et al. |
| 2014/0276605 | A1 | 9/2014 | Tejani et al. |
| 2014/0277333 | A1 | 9/2014 | Lewis |
| 2016/0184557 | A1 | 6/2016 | Call et al. |
| 2016/0317174 | A1 | 11/2016 | Dake |
| 2017/0007277 | A1 | 1/2017 | Drapeau et al. |
| 2018/0008268 | A1 | 1/2018 | Khairkhakan |
| 2019/0175199 | A1 | 6/2019 | Girdhar et al. |
| 2019/0269392 | A1 | 9/2019 | Celermajer et al. |
| 2019/0298521 | A1 | 10/2019 | Rafiee et al. |
| 2019/0343634 | A1 | 11/2019 | Garvin |
| 2020/0146690 | A1 | 5/2020 | Rothstein et al. |
| 2020/0383717 | A1 | 12/2020 | Lederman et al. |
| 2021/0068892 | A1 | 3/2021 | Urbanski et al. |
| 2021/0137579 | A1 | 5/2021 | Rafiee et al. |
| 2021/0212756 | A1 | 7/2021 | Rafiee et al. |
| 2021/0228227 | A1 | 7/2021 | Vardi et al. |
| 2021/0307823 | A1 | 10/2021 | Urbanski |
| 2022/0023046 | A1 | 1/2022 | Basude |
| 2022/0096103 | A1 | 3/2022 | Chou et al. |
| 2022/0110577 | A1 | 4/2022 | Highsmith et al. |
| 2022/0117736 | A1 | 4/2022 | Rafiee et al. |
| 2022/0296291 | A1 | 9/2022 | Anderson et al. |
| 2022/0361908 | A1 | 11/2022 | Karrowini et al. |
| 2023/0270424 | A1 | 8/2023 | Sarabia |
| 2023/0301784 | A1 | 9/2023 | Walters et al. |
| 2024/0099770 | A1 | 3/2024 | Kim |
| 2025/0000575 | A1 | 1/2025 | Lederman |

FOREIGN PATENT DOCUMENTS

| | | |
|---|---|---|
| EP | 3175813 B1 | 1/2020 |
| RU | 2152757 C1 | 7/2000 |
| WO | 2018009718 A1 | 1/2018 |
| WO | 2019/040943 A1 | 2/2019 |
| WO | 2019164806 A1 | 8/2019 |
| WO | 2021072331 A1 | 4/2021 |
| WO | 2022066621 A1 | 3/2022 |
| WO | 2023069983 A1 | 4/2023 |
| WO | 2023/133499 A1 | 7/2023 |

OTHER PUBLICATIONS

International Search Report mailed Jan. 27, 2022 for International Patent Application No. PCT/US2021/049952.

Unpublished International Patent Application No. PCT/US2021/049952 downloaded from ePCT on Jan. 28, 2022.

Written Opinion of the International Searching Authority for International Application No. PCT/US2018/048177 mailed Nov. 19, 2018.

International Search Report for International Application No. PCT/US2018/048177 mailed Dec. 20, 2018.

Khan et al., "Intentional Laceration of the Anterior Mitral Valve Leaflet to Prevent Left Ventricular Outflow Tract Obstruction During Transcatheter Mitral Valve Replacement", JACC: Cardiovascular Interventions vol. 9, No. 17, 2016.

Babaliaros et al., "Intentional Percutaneous Laceration of the Anterior Mitral Leaflet to Prevent Outflow Obstruction During Transcatheter Mitral Valve Replacement First-in-Human Experience", JACC: Cardiovascular Interventions vol. 10 , No. 8, 2017.

Lederman et al., "Preventing Coronary Obstruction During Transcatheter Aortic Valve Replacement From Computed Tomography to Basilica", JACC: Cardiovascular Interventions vol. 12 , No. 13. 2019, pp. 1197-1216.

Khan et al., "Predicting Left Ventricular Outflow Tract Obstruction Despite Anterior Mitral Leaflet Resection The "Skirt NeoLVOT"", JACC: Cardiovascular Interventions Sep. 2019, vol. 11 , No. 9, pp. 1356-1359.

Case, "Tip to Base LAMPOON to PRevent Left Ventricular Outflow Tract Obstruction in Valve in Valve Transcatheter Mitral Valve Replacement", JACC: Cardiovascular Interventions, May 2020, vol. 13, No. 9, pp. 1126-1128.

Greenbaum et al., "First-in-human transcatheter pledglet-assisted suture tricuspid annuloplasty for severe tricuspid insufficiency," Catheterization and Cardiovascular Interventions, May 2020, 5 pages.

Kamioka et al., "BI-SILICA During Transcatheter Aortic Valve Replacement for Noncalcific Aortic Insufficiency: Initial Human Experience", JACC: Cardiovascular Interventions, Nov. 2018, vol. 11, No. 21, pp. 2237-2239.

Kasel et al, "International Lampoon: First European experience with laceration of the anterior mitral valve leaflet prior to transseptal transcatheter mitral valve implantation", Eurointervention, Sep. 2018, col. 14, No. 7, pp. 746-749.

Khan et al, "The Basilica Trial: Prospective Multicenter Investigation of Intentional Leaflet Laceration to Prevent TAVR Coronary Obstruction", JACC: Cardiovascular Interventions, 2019, vol. 12, No. 13, pp. 1240-1252.

Khan et al, "Transcatheter Mitral Valve Replacement after Transcatheter Electrosurgical Laceration of Alfieri stitch (Elastic): First in human report," JACC: Cardiovascular Interventions, Apr. 2018, vol. 11, No. 8, pp. 1808-1811.

Khan et al, "Transcatheter Electrosurgery: JACC State of the art review," Journal of the American College of Cardiology, Mar. 2020, vol. 75, No. 12, pp. 1455-1470.

(56) References Cited

OTHER PUBLICATIONS

Khan et al., "Antetrior Leaflet Laceration to Prevent Ventricular Outflow Tract Obstruction During Transcatheter Mitral Valve Replacement," Journal of the American College of Cardiology, May 2019, vol. 73, No. 20, pp. 2521-2534.

Khan et al, "Rescue LAMPOON to Treat Transcatheter Mitral Valve Replacement—Associated Left Ventricular Outflow Tract Obstruction", JACC: Cardiovascular Interventions, Jul. 2019, vol. 12, No. 13, pp. 1283-1284.

Lisko et al., "Pachyderm Shape guiding catheters to simplify Basilica leaflet traversal," Cardiovsacular Revascularization Medicine, Sep. 2019, vol. 20, No. 9, pp. 782-785.

Lisko et al., "Electrosurgical detachment of Mitraclips from the anterior mitral leaflet prior to transcatheter mitral valve implantation," JACC: Cardiovascular Interventions, Oct. 2020, vol. 13, No. 20, pp. 2361-2370.

Khan et al., "LAMPOON to facilitate tendyn Antetrior Leaflet Laceration to Prevent Ventricular Outflow Tract Obstruction During Transcatehter Mitral Valve Replacement," Journal of the American College of Cardiology, May 2019, vol. 73, No. 20, pp. 2521-2534.

International Search Report mailed Jun. 22, 2023 for International Application No. PCT/US23/60223.

Written Opinion and International Search Report mailed Mar. 1, 2021 for International Patent Application No. PCT/US2020/055160.

Written Opinion and International Search Report mailed Oct. 22, 2021 for International Patent Application No. PCT/US2021/040511.

Extended European Search Report for Application No. 18848165.9 dated Apr. 30, 2021.

Supplementary European Search Report and European Search Opinion for Application No. 19756527.8 dated Oct. 18, 2021.

International Search Report for co-pending international application No. PCT./US2023/084619, mailed Apr. 17, 2024.

International Search Report for co-pending international application No. PCT/US2023/084620, mailed Apr. 18, 2024.

International Search Report for co-pending international application No. PCT/US2023/084621, mailed May 30, 2024.

Written Opinion of the International Searching Authority for co-pending international application No. PCTUS2023/084619, mailed Apr. 17, 2024.

Written Opinion of the International Searching Authority for co-pending international application No. PCT/US2023/084620, mailed Apr. 18, 2024.

Written Opinion of the International Searching Authority for co-pending international application No. PCT/US2023/084621, mailed May 30, 2024.

Non-final office action mailed Mar. 14, 2024 in co-pending U.S. Appl. No. 18/390,687.

Non-final office action mailed Apr. 8, 2024 in co-pending U.S. Appl. No. 18/390,711.

\* cited by examiner

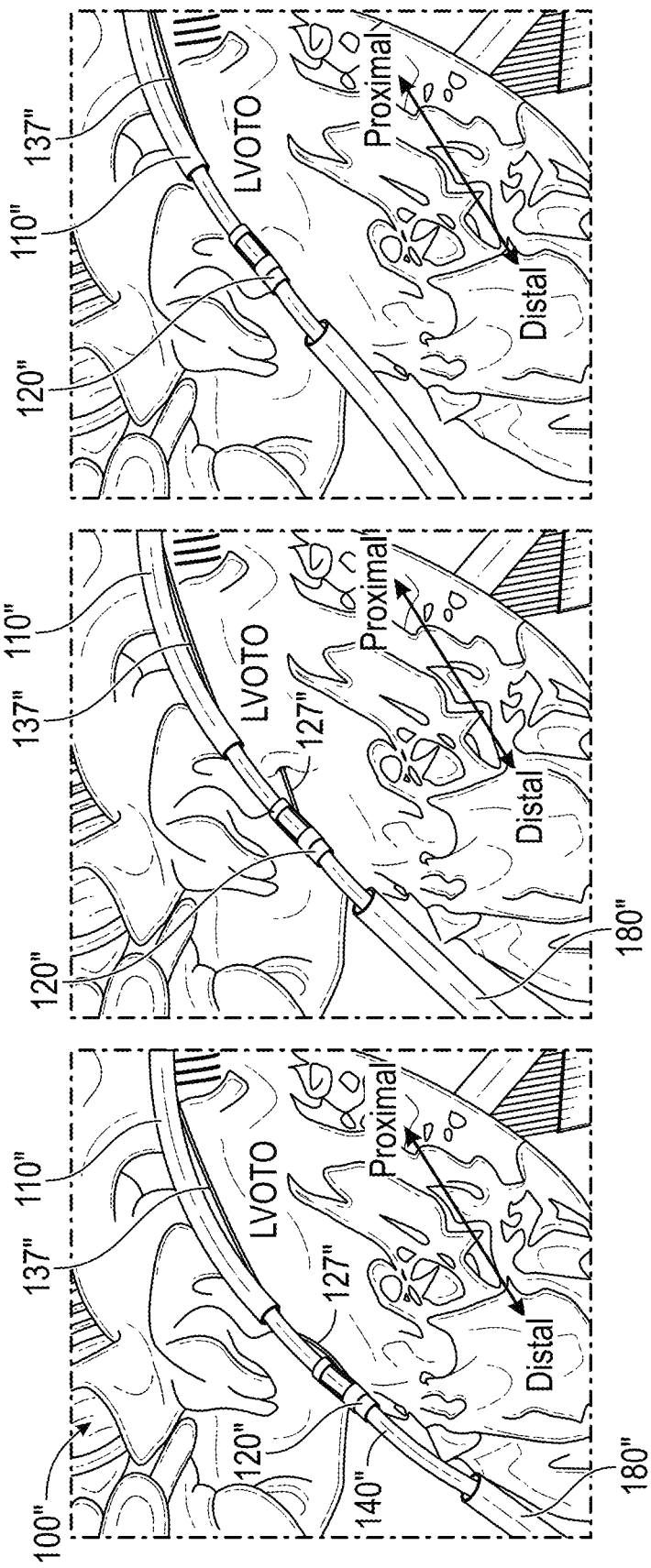

TISSUE CUTTING SYSTEMS AND METHODS

CROSS-REFERENCE TO RELATED APPLICATIONS

The present patent application claims the benefit of priority to and is a continuation of International Patent Application No. PCT/US2023/84620, filed Dec. 18, 2023, which in turn claims the benefit of priority to U.S. Provisional Patent Application No. 63/477,317, filed Dec. 27, 2022, U.S. Provisional Patent Application No. 63/496,566, filed Apr. 17, 2023, U.S. Provisional Patent Application No. 63/533,271, filed Aug. 17, 2023, and U.S. Provisional Patent Application No. 63/605,856, filed Dec. 4, 2023. International Patent Application No. PCT/US2023/84620 is hereby incorporated by reference herein in its entirety for all purposes.

BACKGROUND

The disclosure relates generally to medical treatment devices and techniques, and, in some aspects, to methods and devices for diagnosis and treatment of myocardial tissue. The present disclosure provides improvements over the state of the art.

SUMMARY OF THE DISCLOSURE

BASILICA and LAMPOON are aortic and mitral leaflet laceration procedures that use transcatheter electrosurgery. A guidewire traverses potentially obstructive heart valve leaflet tissue and then the inner-curvature of the kinked guidewire traversing the leaflet is electrified during traction to accomplish a longitudinal split of the leaflet.

Left ventricular outflow tract (LVOT) obstruction complicates hypertrophic cardiomyopathy and transcatheter mitral valve replacement. Septal reduction therapies including surgical myectomy and alcohol septal ablation are limited by surgical morbidity or coronary anatomy and high pacemaker rates respectively. Applicants have developed a novel transcatheter procedure, mimicking surgical myotomy, called SESAME (SEptal Scoring Along the Midline Endocardium). The SESAME procedure uses an insulation-modified guidewire to lacerate myocardium (heart muscle) instead of heart leaflet tissue, using a different system design from the BASILICA and LAMPOON procedures. In some aspects, the SESAME electrosurgical procedure can include an asymmetric insulation gap astride the guidewire kink, or bend. The kink or bend concentrates electrical charge and helps to position the charge-delivery-device at the therapy target to avoid bystander injury. The insulation gap, discussed below, is intended to overcome the tendency of charge to concentrate on the outer aspect of a kink.

In accordance with the present disclosure, implementations of a device to cut tissue are provided. Some such implementations include an elongate body having a proximal end and a distal end, an elongate tether operably coupled to the elongate body, wherein the elongate tether and elongate body are configured to be longitudinally displaceable with respect to one another. The device can further include a cutting element disposed on the elongate tether, wherein relative longitudinal movement of the elongate tether and the elongate body causes the cutting element to cut through anatomical tissue that the device is placed adjacent to.

In some implementations, the elongate tether can be configured to be received at least partially within a lumen defined in the elongate body. The cutting element can include at least one blade that is configured to cut through tissue. The cutting element can include an electrically conductive element configured to be coupled to an electrical power source in order to electrify the electrically conductive element.

In some implementations, the cutting element can include at least one blade that is configured to cut through tissue. The cutting element can include an electrically conductive element configured to be coupled to an electrical power source in order to electrify the electrically conductive element. The electrically conductive element can include at least one supply electrode configured to physically contact tissue to be cut. The supply electrode can be configured to be operably coupled to an electrical power supply to supply current to the supply electrode.

In some implementations, the device can further include a return electrode configured to direct current from a region proximate the supply electrode back to the electrical power supply. The return electrode is operably coupled to the tether. In some implementations, the device can further include a tissue anchor disposed at a distal end of the elongate tether. If desired, the return electrode is operably coupled to the anchor. The tether can include a return conductor along its length operably coupled to the return electrode. The return electrode can include the anchor.

In some implementations, the tether can exit through a distal end of the elongate body. In some implementations, the tether can exit through a lateral side port defined through a side wall of the elongate body proximate a distal end region of the elongate body. The device can further include a plurality of markers disposed along the tether separated by a predetermined spacing. In some implementations, the device can further include a guidewire passage disposed along at least a portion of a length of the elongate body. The guidewire passage can extend to a distal tip of the elongate body. The tether can exit the elongate body through a lateral side port defined in the elongate body. The tissue anchor and/or the elongate tether can be coupled to a proximal anchor. The elongate tether can be movably disposed within a lumen of the elongate body along a majority of the length of the elongate body. The elongate body can be slidably disposed within a lumen of at least one outer deflectable catheter.

In some implementations, the device can further include an actuator assembly operably coupled to a proximal portion of the elongate body and to a proximal region of the elongate tether. The actuator assembly can be configured to permit a user to selectively move the elongate body with respect to the elongate tether. In some implementations, the actuator assembly can include (i) a first actuator operably coupled to a proximal end of the elongate body and (ii) a proximal anchor to secure a proximal region of the elongate tether. The first actuator can be configured to longitudinally displace the elongate member with respect to the proximal anchor to permit the elongate body to be selectively moved proximally and distally with respect to the proximal anchor. The elongate body can be configured to ride along the elongate tether.

In some implementations, the actuator assembly can further include a second actuator operably coupled to a proximal end of a first outer catheter. The first outer catheter can define a lumen along its length that surrounds the elongate member and the tether. The second actuator can be actuated to longitudinally displace the first outer catheter with respect to the elongate tether and the elongate body. The actuator assembly can further include a third actuator operably coupled to a proximal end of a second outer catheter. The second outer catheter can define a lumen along its length that surrounds the first outer catheter, the elongate member and the tether. The third actuator can be actuated to longitudinally displace the second outer catheter with respect to the elongate tether, the elongate body and the first outer catheter.

In some implementations, the first outer catheter and the second outer catheter can include active or passive steering mechanisms that permit the distal end region of each said catheter to be actively steered by a user. The elongate member can include an inner catheter that includes a steering mechanism to permit the distal end region of the inner catheter to be actively steered by a user. In some implementations, the elongate tether can be configured to be coupled to a distal anchor configured to be deployed into tissue proximate a distal end of the device. The proximal anchor can include a tensioner to selectively apply tension to the tether when the distal anchor is deployed into the tissue. The inner catheter can be configured to slide proximally and distally over the tether after the tether is tensioned. The first outer catheter can be configured to slide proximally and distally over the inner catheter. The second outer catheter can be configured to slide proximally and distally over the first outer catheter. Each of the proximal anchor, first actuator, second actuator and third actuator can be operably coupled to a respective carrier. Each respective carrier can be configured to slide on a common guide rail.

In some implementations, a proximal end of the inner catheter can be configured to be lifted out of the first actuator. A proximal end of the first outer catheter can be configured to be lifted out of the second actuator. A proximal end of the second outer catheter can be configured to be lifted out of the third actuator. The tensioner can include a first body coupled to the common guide rail and a second body that is movable with respect to the first body, wherein the second body is fixedly coupled to the tether. The second body can be coupled to the first body by an elastic member, such as a tension spring or a coiled spring, such as a flat spring. The second body can be movable from a first position wherein the tether is not tensioned to a second position wherein the tether is tensioned. The second body can be moved from the first position to the second position along a linear path. The second body can be moved from the first position to the second position along a curved path.

In some implementations, the tether can include a tubular member that defines a passageway therethrough. The tissue anchor can be operably coupled to the distal end of the tether by way of a flexible coupling. The flexible coupling permits the tissue anchor to swivel with respect to the distal end of the tether. The at least one supply electrode can include at least one electrode configured to supply current, at least one electrode to return current to a power source to complete a circuit, and at least one sensing electrode; which can comprise the same physical electrodes, or different physical electrodes.

In some implementations, a radiopaque marker can be provided proximate the lateral side port to permit a user to determine the longitudinal and rotational orientation of the lateral side port. The elongate tether can include an elongate tubular member, and the tissue anchor can be configured to be deployed out of a distal port of the elongate tubular member. The tissue anchor can be pivotally coupled about a pivot point to a distal end of an elongate inner member disposed within the elongate tubular member. The device can further include a tension member coupled proximate a distal end of the tissue anchor. The tension member can be directed proximally through the elongate tubular member to be externalized from a patient. Applying tension to the tension member causes the anchor to articulate about the pivot point until at least one tine of the tissue anchor points along a proximal direction. The device can further include at least one visualization marker proximate a distal end or an exit port of at least one of the elongate body, the first outer catheter, the second outer catheter, the elongate tether, and the anchor. One or more of the visualization markers can include radiopaque material.

The elongate body can be configured to be held stationary adjacent anatomical tissue. The at least one cutting element can be disposed on the elongate tether. The elongate tether and cutting element can be configured to be slid alongside or within the elongate body in a reciprocating manner while the elongate body is held in a stationary position adjacent the anatomical tissue. The elongate tether can be configured to be received at least partially within a lumen defined in the elongate body. The elongate tether can be configured to exit from a proximal exit port formed in the elongate body and further wherein the elongate tether can be configured to re-enter the elongate body in a distal entrance port. The elongate body can be configured to be bent into a deployed configuration along a region that includes the proximal exit port and the distal entrance port. The elongate body can be bent into the deployed configuration, and the elongate tether can be directed away from the elongate body when the elongate tether is under tension.

In some implementations, a distal end of the elongate tether is coupled to a distal portion of the elongate body by an elastic element that can stretch longitudinally, and further wherein the elastic element is configured to retract the elongate tether in a distal direction when tension is reduced on the proximal end of the tether. The elastic element can include a tension spring. The elongate body can be configured to be deformed at least partially around an anatomic structure to be cut by the device. The elongate tether can include a cutting electrode mounted thereon configured to be coupled to an electrosurgical power source. In some implementations, the device can further include a depth sensing electrode to sense the depth of the tissue that the elongate tether is passing through. In some implementations, the elongate body can include a flexible distal section disposed distally of the distal entrance port to conform to the anatomy of a patient's ventricle. If desired, the elongate tether can pass around a bearing surface located on or within the elongate body located distally of the distal entrance port, and the elongate tether can pass through the elongate body to permit both ends of the elongate tether to be externalized from a patient while performing a cutting operation in the patient's heart. The elongate body can define a first elongate body and a proximal end of the elongate tether can be coupled to a second elongate body configured to move alongside or at least partially within the first elongate body. The elongate tether can include at least one of a radiopaque wire, a radiopaque suture material, a textured body, a radiofrequency (RF) electrode and a razor wire. In some implementations, the elongate tether can be operably coupled to an outer tubular member that is configured to be advanced proximally and distally over the elongate body. The elongate tether can be configured to cause the outer tubular member to form a bowed shape when tension is applied to the elongate tether. The elongate tether can be configured to be biased laterally away from the outer tubular member when the outer tubular member is formed into the bowed shape to permit the at least one cutting element disposed on the elongate tether to cut through tissue as the outer tubular member is advanced proximally and distally over the elongate body. In some implementations, the elongate body can define a tissue anchor that deploys along a proximal direction from a first location wherein the tissue anchor is disposed at least partially within the elongate body to a second location wherein the tissue anchor is advanced outwardly from the elongate body along a proximal direction into a tissue mass.

The foregoing and other features and advantages of the disclosed technology will become more apparent from the following detailed description of several embodiments which proceeds with reference to the accompanying figures.

BRIEF DESCRIPTION OF THE FIGURES

FIGS. 14A-14C illustrate aspects of a further technique to treat a LVOTO in accordance with the present disclosure that includes deploying an anchor proximate a distal location of the LVOTO structure.

DETAILED DESCRIPTION

The present application presents advantages and improvements over systems described in International Patent Application No. PCT/US2023/060223, filed Jan. 6, 2023. The aforementioned patent application is incorporated by reference herein in its entirety for all purposes.

Implementations in accordance with the present disclosure provide improved systems and methods for cutting tissue, including but not limited to myocardial tissue. Implementations in accordance with the present disclosure can form a lengthwise cut through tissue utilizing a reciprocating cutter that cuts from an outer surface of an obstruction, such as a LVOTO, downwardly into the tissue. This can be contrasted with the techniques described in PCT/US2023/060223, which teaches forming a passageway through tissue near a bottom region of tissue to be cut, and then cutting the tissue above the passageway to complete the cut. It will be appreciated by those of skill in the art that the disclosed implementations are fundamentally different from those described in PCT/US2023/060223 in a variety of ways.

FIGS. 1-4 depict aspects of a left ventricular outflow tract obstruction ("LVOTO" herein). While the cutting of a LVOTO is specifically illustrated, it will be appreciated that the disclosed embodiments can be used for other purposes, including the cutting of myocardial tissue to debulk other cardiac structures, or to perform different percutaneous procedures in the cardiovascular system, a patient's sinus passages, within a patient's neurovascular structures, urinary structures, abdominal structures or digestive structures. Moreover, implementations in accordance with the present disclosure can be utilized in laparoscopic, thoracic, and other procedures.

Figure 1:
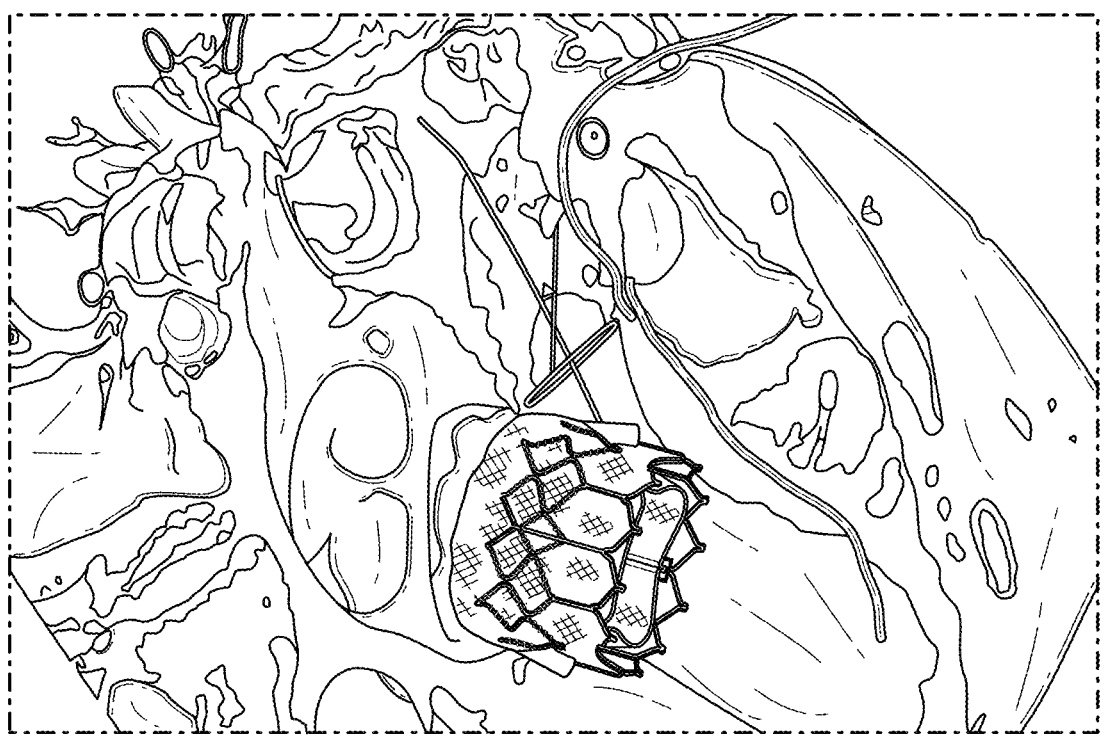
FIG. 1 is a representative illustration of a three-dimensional cardiac computed tomography image with a virtually embedded artificial SAPIEN™ valve in the mitral position to guide in predicting LVOT obstruction.

FIG. 1 is a representative illustration of a three-dimensional cardiac computed tomography image with a virtually embedded artificial SAPIEN™ valve in the mitral position to guide in predicting LVOT obstruction. In some implementations of procedures according to the present disclosure, pre-procedure planning can include generating a dedicated cardiac computed tomography ("CT") image to measure one or more of a variety of variables to assist in performing a tissue cutting procedure. For example, the CT image can be used to determine, or closely estimate valve size. This can also be facilitated with a transesophageal echocardiogram ("TEE"). It is also possible to measure the actual internal dimension of the valve under visualization which can then be correlated with the true internal dimension of the failed bioprosthetic valve. Comparing the measured value with the known value of the device can provide a proper basis for scaling the image to more closely measure the actual dimensions of internal cardiac structures. With continuing reference to FIG. 1, it is further possible to measure the aorto-mitral angle, wherein a favorable angle is in excess of 105 degrees. Moreover, it is possible to measure, or to at least estimate, the dimensions of a neo-left ventricular outflow tract (LVOT) area after a "virtual" implantation of a SAPIEN valve, as depicted in FIG. 1. Preferably, the LVOT area will exceed 200 mm$^2$ to prevent LVOT obstruction. If the patient's septum is thick, alcohol septal ablation can be performed ahead of time to debulk the septum somewhat and decrease the risk of LVOT obstruction in cases where the predicted neo-LVOT area is less than 200 mm². It is also possible to perform balloon assisted translocation of the mitral anterior leaflet to prevent LVOT obstruction, which is a significant concern of transcatheter mitral valve replacement ("TMVR"). Success rates for TMVR procedures is about 94-97%, with 91-95% 30-day survival and 86% 1-year survival rates.

Figures 2A, 2B:
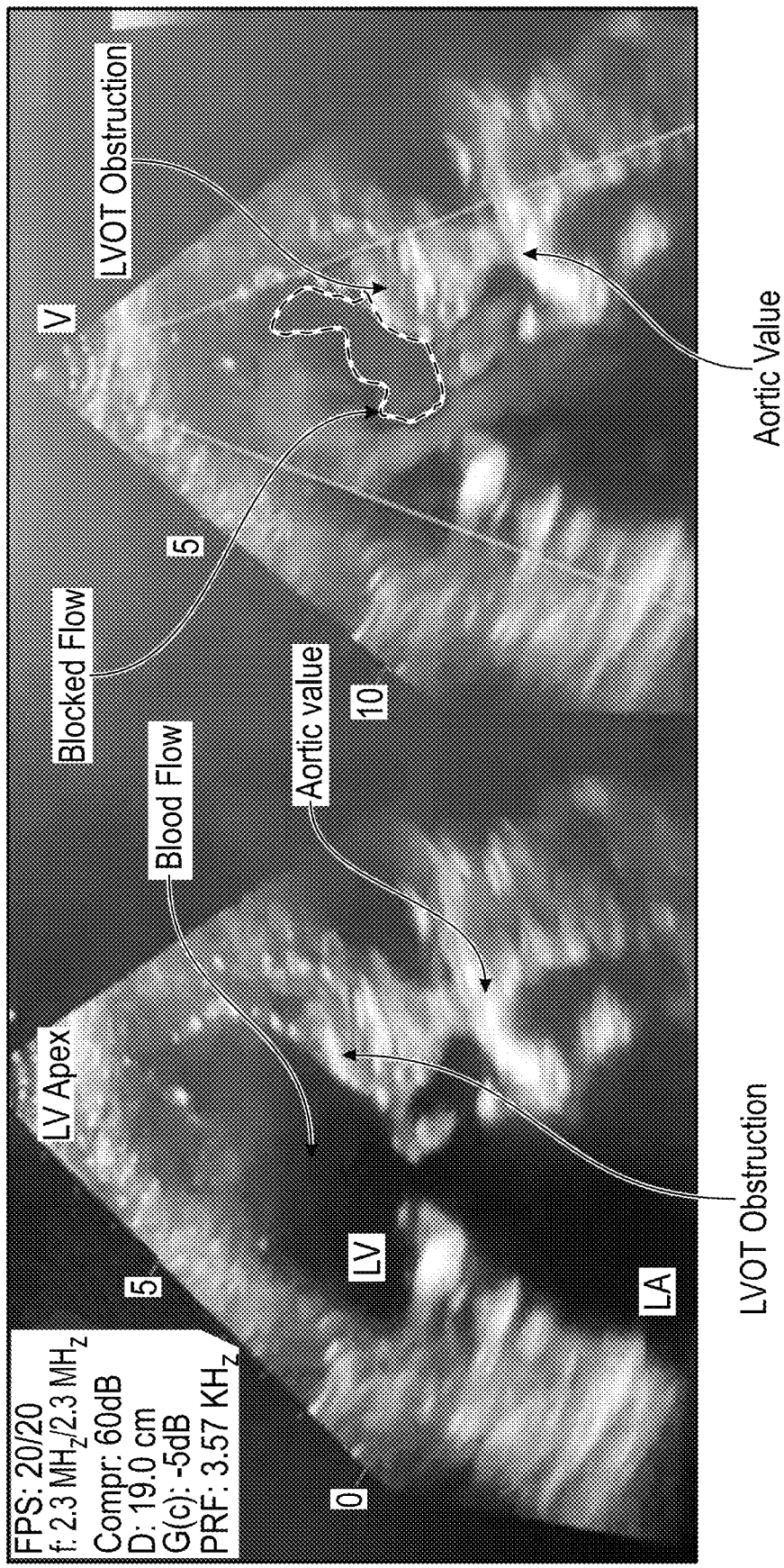
FIGS. 2A-2B are representative echocardiograms illustrating the presence of a flow obstruction within the left ventricular outflow tract that contributes to blocking blood flow to the aorta of a patient.

FIGS. 2A-2B are representative echocardiograms illustrating the presence of a flow obstruction within the left ventricular outflow tract that contributes to blocking blood flow to the aorta of a patient. In FIG. 2A, an LVOT obstruction is blocking blood flow (area inside dashed lines in FIG. 2B) to the aorta by way of the LVOT.

Figure 3:
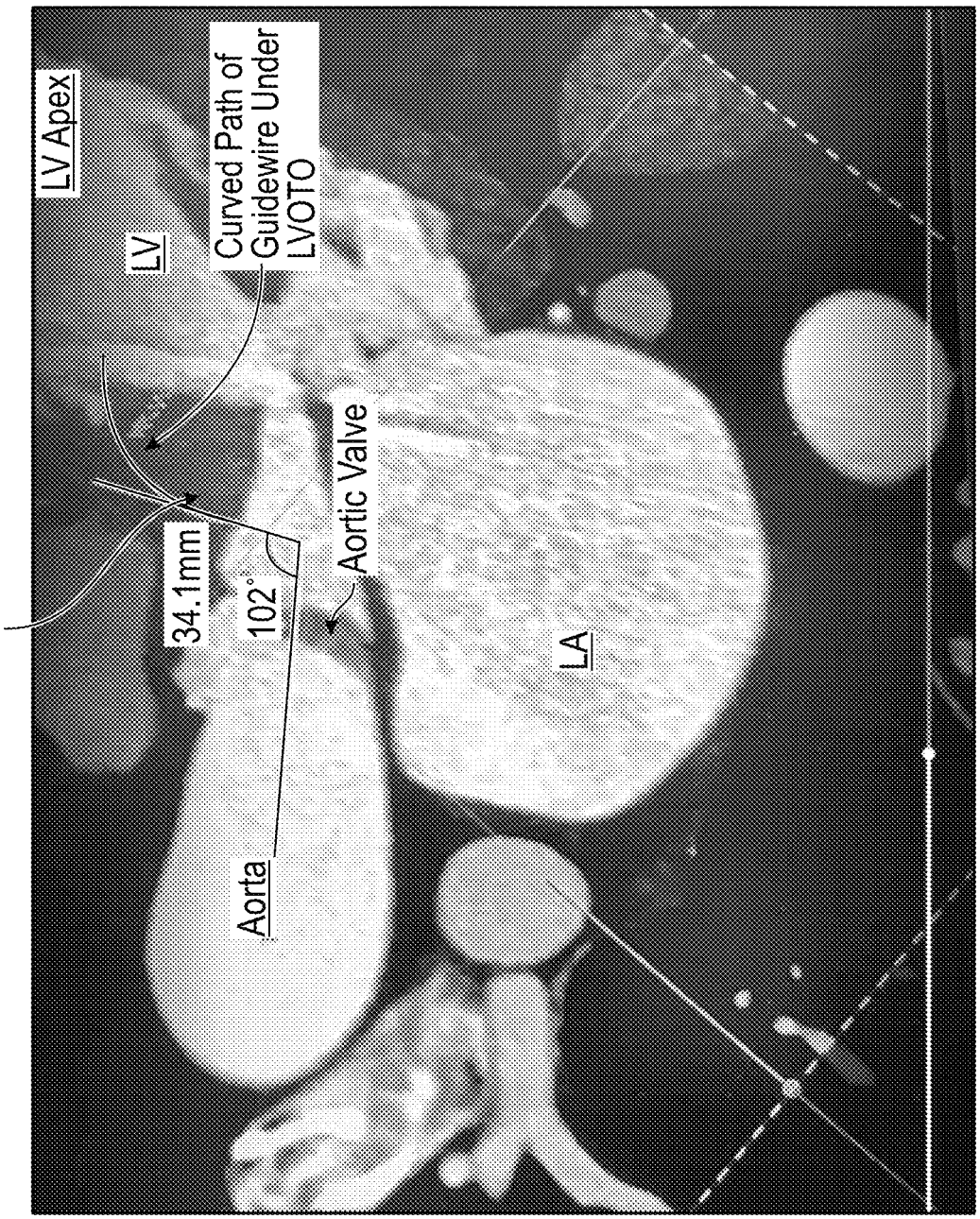
FIG. 3 is a representative computerized tomography (CT) scan illustrating a cross section of a patient's heart indicating the location of left ventricular outflow tract obstruction (LVOTO).

FIG. 3 is a representative computerized tomography (CT) scan illustrating a cross section of a patient's heart indicating the location of left ventricular outflow tract obstruction ("LVOTO"). The procedure described in PCT/US2023/060223 can be performed, wherein an electrified guidewire is navigated through the obstruction by tunneling through the mass starting at a proximal end of the mass (facing away from the ventricular apex) along a direction toward the ventricular apex where the guidewire exits the mass and re-enters the volume of the ventricle, effectively forming a tunnel through a bottom portion of the tissue mass. The distal end of the guidewire can be snared once exiting the tissue mass. The initial trajectory for the guidewire is perpendicular to the surface of the septum to penetrate the sometimes tough, basal septum. As seen in FIG. 3, the pathway of the guidewire is not straight, but curves off the initial vector to avoid crossing into the right ventricle and creating a ventricular septal defect ("VSD"). In FIG. 3, for purposes of clarity, "LA" refers to the left atrium and "LV" refers to the left ventricle.

Figure 4:
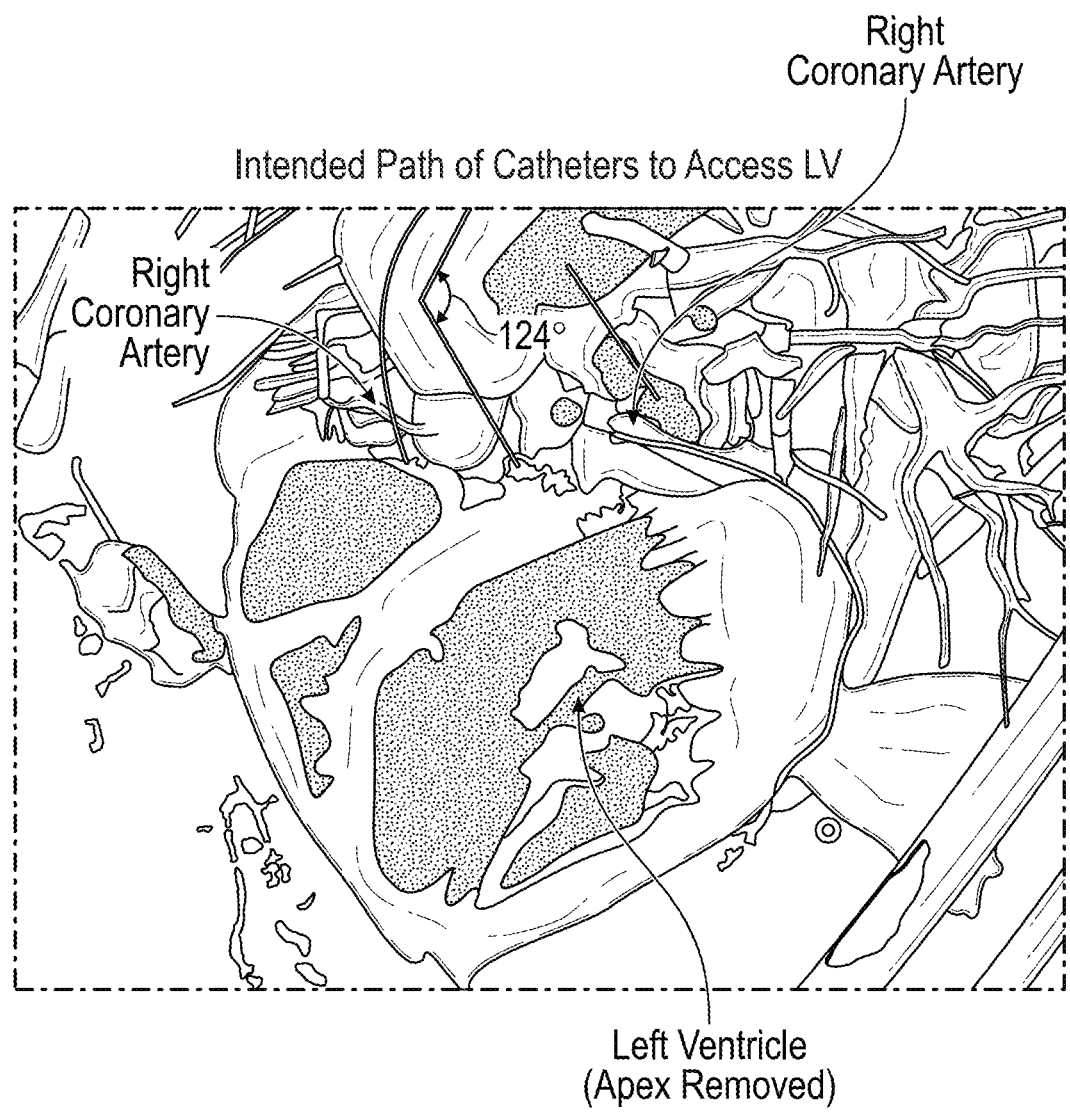
FIG. 4 is a further a representative computerized tomography (CT) scan illustrating a cross section of a patient's heart indicating a representative path of catheters to access the left ventricle of a patient.

FIG. 4 is a further representative "three-dimensional" computerized tomography (CT) scan illustrating a cross section of a patient's heart indicating a representative path of catheters to access the left ventricle of a patient. In FIG. 4, the path to the basal end of the intended cut typically starts just to the right side of the left-right commissure of the aortic valve. In view of the foregoing, and the teachings of PCT/US2023/060223, it will be appreciated that further approaches for performing similar procedures allowing additional device control during the procedure can be desirable.

Figure 5:
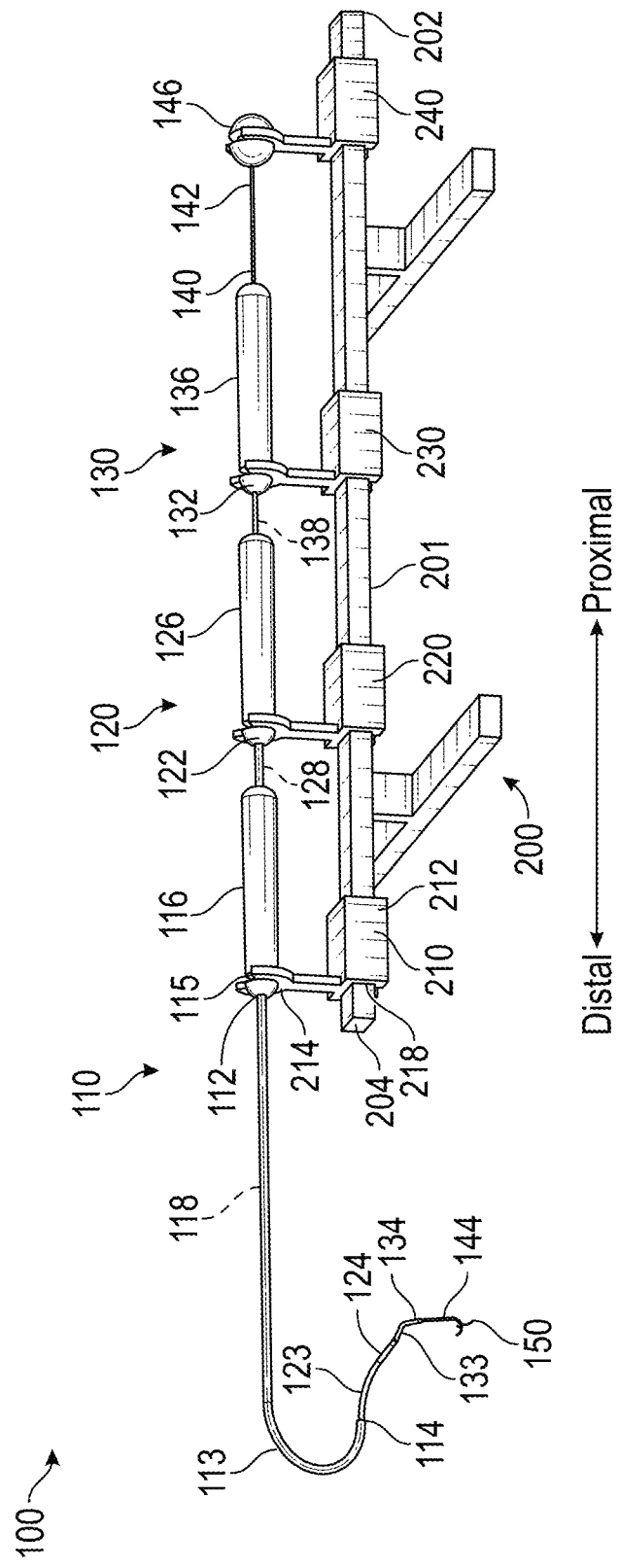
FIG. 5 is a representative implementation of a catheter-based system to perform a percutaneous procedure to cut tissue in accordance with the present disclosure using a reciprocating cutter.

Thus, in further accordance with the present disclosure, a first representative implementation for a system 100 for cutting tissue is depicted in FIG. 5. Further aspects of system 100 are depicted in FIGS. 6-12C.

FIG. 5 is a representative implementation of a catheter-based system 100 to perform a percutaneous procedure to cut tissue in accordance with the present disclosure. While the system 100 utilizes a reciprocating cutter (described below), the system 100 can be configured with different end effectors to perform different procedures. The system 100, as depicted includes three concentrically disposed deflectable catheters including a radially outermost catheter 110, within which a second deflectable intermediate catheter 120 is slidably received. A third, innermost deflectable catheter 130 can be slidably disposed within deflectable catheter 120. A tether 140, or other instrumentality, such as a guidewire, a snare or the like can be slidably received within catheter 130. Each deflectable catheter 110, 120, 130 can include one or more steering wires (not shown) to which tension can be applied to selectively cause the distal end (114, 124, 134) of each respective catheter (110, 120, 130) to bend in a preferential direction. Each catheter 110, 120, 130 is comprised of a tubular body having a proximal end coupled to an actuator and a free distal end. Each catheter 110, 120, 130 can be moved axially and rotationally with respect to the other components of system 100. Each catheter 110, 120, 130 is held in relative position by a respective carriage 210, 220, 230 that is slidably received on a rail 201 of a stand 200 of system 100. Each carriage 210, 220, 230 can be axially translated between the proximal end 202 and the distal end 204 of the rail 201. In some implementations, one or more of the carriages 210, 220, 230 can be locked in place with respect to the rail 201. As depicted, each catheter 110, 120, 130 is slidably received along a vertical direction into an upwardly extending portion of a respective carriage in a fork shaped coupling (e.g., 214). For example, a channel 115 is formed into catheter 100 that is slidably received within fork 214 to prevent axial movement of catheter 210 with respect to carriage 210. Each carriage (e.g., 210) is defined by a main body portion (e.g., 212) that defines a channel (e.g., 218) therethrough to at least partially surround rail 201 of stand 200.

Each of catheters 110, 120, 130 can be displaced rotationally about a central axis of system 100 (e.g., about tether 140) with respect to tether 140, and each other. It will be appreciated that any of catheters 110, 120, 130 can be utilized with stand 200 alone, or in combination with other system components. Thus, a triple catheter assembly may be used as depicted in FIG. 5, or a single or double catheter assembly may be used if all three catheters are not required. Catheters 110, 120, 130 can be of any desired length. In accordance with some implementations, catheter 110 can be between about 80 cm and about 120 cm in length, or any increment therebetween of about one centimeter. In accordance with further aspects, catheter 120 can be between about 90 cm and about 140 cm in length, or any increment therebetween of about one centimeter. In accordance with still further aspects, catheter 130 can be between about 100 cm and about 160 cm in length, or any increment therebetween of about one centimeter. Tether 140 can be any desired length, such as between about 120 and 300 cm in length, or any increment therebetween of about one centimeter.

With continuing reference to FIG. 5, outermost catheter 110 is comprised of an elongate tubular body 113 having a proximal end 112 operably coupled to an actuator 116 and a free distal end 114 that may be steered by tensioning a steering wire, for example, that is actuated by one or more buttons or levers within the actuator 116. Outermost catheter 110 further defines a lumen 118 (not shown) along at least a part of its length to slidably receive tubular shaft 123 of catheter 120. Catheter 110 can be slid along rail 201 and locked in place on rail 201, if desired. In use, the outer surface of tubular portion 113 of catheter 110 is fluidly sealingly received through an entrance port (not shown) that is fluidly coupled to a patient's anatomy. Consequently, in use, sliding movement of carriage 210 with respect to track or rail 201 results in proximal-distal movement of catheter 110 within a patient's vasculature independently of movement of catheters 120, 130, or tether 140.

Intermediate catheter 120, in turn, is comprised of an elongate tubular body 123 having a proximal end 122 operably coupled to an actuator 126 and a free distal end 124 that may be steered by tensioning a steering wire, for example, that is actuated by one or more buttons or levers within the actuator 126. Intermediate catheter 120 further defines a lumen 128 (not shown) along at least a part of its length to slidably receive tubular shaft 133 of catheter 130 therein. Intermediate catheter 120 can be slid along rail 201 and locked in place on rail 201, if desired, as with catheter 110. In use, the outer surface of tubular portion 123 of catheter 120 is fluidly sealingly received through an entrance port (not shown) located proximally or within actuator/handle 116 of catheter 110 to prevent undesired leakage of fluid between any annular clearance formed between the inner surface of lumen 118 and the outer surface of tubular member 123. As with catheter 110, in use, sliding movement of carriage 220 with respect to track or rail 201 results in proximal-distal movement of catheter 120 within a patient's vasculature independently of movement of catheters 110, 130, or tether 140. Further, catheter 120 can be displaced rotationally about central axis of system 100 (e.g., about tether 140) with respect to tether 140, catheter 110, and catheter 130.

With continuing reference to FIG. 5, innermost catheter 130 is comprised of an elongate tubular body 133 having a proximal end 132 operably coupled to an actuator 136 and a free distal end 134 that may be steered by tensioning a steering wire, for example, that is actuated by one or more buttons or levers within the actuator 136. Intermediate catheter 130 further defines a lumen 138 (not shown) along at least a part of its length to slidably receive tether 140 therethrough. Innermost catheter 130 can be slid along rail 201 and locked in place on rail 201, if desired, as with catheters 110, 120. In use, the outer surface of tubular portion 133 of catheter 130 is fluidly sealingly received through an entrance port (not shown) located proximally or within actuator/handle 126 of catheter 120 to prevent undesired leakage of fluid between any annular clearance formed between the inner surface of lumen 128 and the outer surface of tubular member 133. As with catheters 110, 120, in use, sliding movement of carriage 230 with respect to track or rail 201 results in proximal-distal movement of catheter 130 within a patient's vasculature independently of movement of catheters 110, 120, or tether 140. Further, catheter 130 can be displaced rotationally about central axis of system 100 (e.g., about tether 140) with respect to tether 140, catheter 110, and catheter 120.

Each of the catheters set forth herein (e.g., 110, 120, 130) can be made from a variety of materials, including multilayer polymeric extrusions, such as those described in U.S. Pat. No. 6,464,683 to Samuelson or U.S. Pat. No. 5,538,510 to Fontirroche, the disclosure of each being incorporated by reference herein in its entirety for all purposes. Other structures are also possible, including single or multilayer tubes reinforced by braiding, such as metallic braiding material. Any of the catheters or guidewires disclosed herein or portions thereof can be provided with regions of varying or stepped-down stiffness with length using any of the techniques set forth in U.S. Pat. No. 7,785,318, which is incorporated by reference herein in its entirety for any purpose whatsoever. The catheters herein (e.g., 110, 120, 130) can be provided with these and other structures to enhance pushability and torqueability. The catheters disclosed herein (e.g., 110, 120, 130) can have a varied stiffness along their length, particularly in their distal regions by adjusting the cross-sectional dimensions of the material to impact stiffness and flexibility, while maintaining pushability, as well as the durometer of the material. Hardness/stiffness is described herein with reference to Shore hardness durometer ("D") values. Shore hardness is measured with an apparatus known as a Durometer and consequently is also known as "Durometer hardness". The hardness value is determined by the penetration of the Durometer indenter foot into the sample. The ASTM test method designation is ASTM D2240 00. For example, in some implementations, a more proximal region of the catheter can have a durometer of about 72 D, an intermediate portion of the catheter (the proximal most 20-30 cm of the last 35 cm, for example that typically traverses an aortic arch) can have a durometer of about 55 D, and the distal 5-10 cm of the catheter can have a durometer of about 35 D.

Any surface of various components of the system described herein or portions thereof (e.g., 110, 120, 130, 140, 150) can be provided with one or more suitable lubricious coatings to facilitate procedures by reduction of frictional forces. Such coatings can include, for example, hydrophobic materials such as Poly TetraFluoroEthylene ("PTFE") or silicone oil, or hydrophilic coatings such as Polyvinyl Pyrrolidone ("PVP"). Other coatings are also possible, including, echogenic materials, radiopaque materials and hydrogels, for example.

With continuing reference to FIG. 5, tether 140 has a proximal end 142 operably coupled to a hub 146, or proximal anchor, that can be used to apply tension to tether 140. Tether 140 further includes a distal end 144 that extends distally from passage 138 from the distal end of innermost catheter 130. As depicted, hub 146 is removably coupled to carriage 240, wherein sliding movement of carriage 240 with respect to track or rail 201 results in proximal-distal movement of tether 140. Preferably, hub 146 and carriage 240 are used in order to maintain tension in tether or rail 140 to facilitate use of the system 100. For example, in some implementations, hub 146 can include a tension spring or elastic member that can be stretched to maintain tension in tether 140. Likewise, if desired, any one of the carriages 210, 220, 230, 240 may include an upper component that is slidably coupled to the main body portion (e.g., 210) of the respective carriage. If so equipped, the carriage can similarly include a tension spring to cause the catheter carried by the respective carriage to return to a desired axial location along the direction of rail 201. This can be useful, for example, in the instance of catheter 130, which can be spring loaded to return from a first deformed position to a contracted position between a first axial location and a second axial location to facilitate a reciprocating cutting operation.

Figure 6:
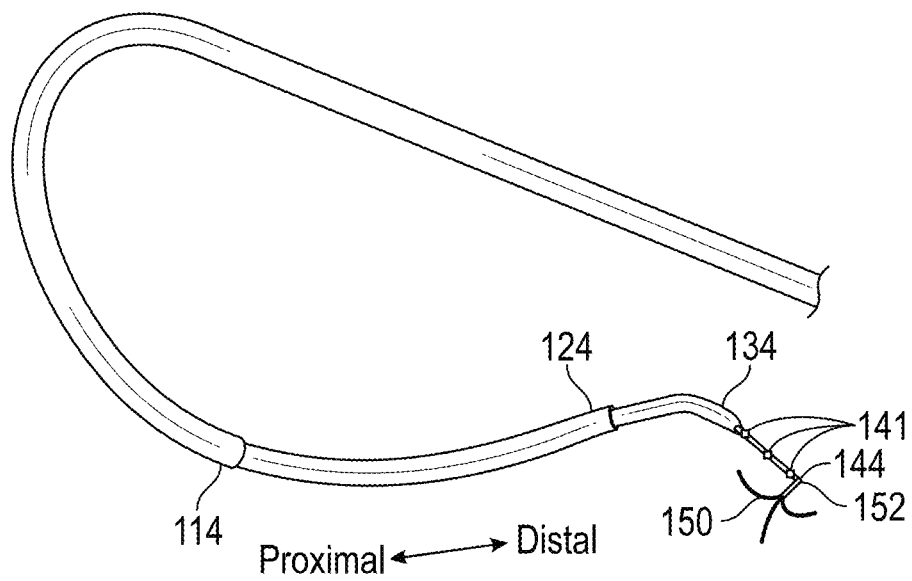
FIG. 6 illustrates aspects of the catheter-based system of FIG. 5 in accordance with some aspects of the present disclosure.

FIG. 6 illustrates further aspects of the catheter-based system 100 of FIG. 5 in accordance with some aspects of the present disclosure. For purposes of illustration, and not limitation, FIG. 6 illustrates a distal region of system 100 in accordance with some implementations of the disclosure. Illustrated are the distal end 114 of the outermost catheter 110, the distal end 124 of the intermediate catheter 120 extending distally from the lumen 118 of the outer catheter, and the distal end 134 of the innermost catheter 130 extending distally from the lumen 128 of the intermediate catheter 120. A distal region of tether 140 extends distally from the lumen 138 of the innermost catheter 130. The distal region of tether 140 can include a plurality of markers 141 that are visible under fluoroscopy or other imaging modality that are set a predetermined, and known, distance apart from each other. A distal end 144 of tether 140 is operably coupled to a tissue anchor 150. Tissue anchor 150 is anchored into tissue within a patient (discussed in further detail below) to permit tension to be applied to tether 140. Once a suitable amount of tension is present in tether 140, tether 140 acts as a guide rail to guide the movement, for example, of the innermost catheter 130 to facilitate a tissue cutting operation using a cutter, for example, as illustrated in FIGS. 14A-15C. The anchor 150 can be provided with a proximally located pivoting coupling 152 to permit the tether 140 to pivot with respect to the anchor 150. The anchor 150 may be made from a radiopaque material, or may be provided with one or more radiopaque markers (not shown) or other markers, as desired. The markers (e.g., 141) can facilitate in situ measurement of a LVOTO, as well as helping to confirm the distance over which catheter 130 reciprocates to perform a cutting procedure, including helping to defined the proximal and distal movement limits of catheter 130 when a cutting element, such as an electrode, of catheter 130 is electrified. This can be used to control the length of the cut through the tissue. In some implementations, if desired, the tether 140 and anchor 150 may not be present and instead a microcatheter or needle (not shown) may be slidably received within lumen 138 of catheter 130. Moreover, innermost catheter 130 can be provided with a retractable and/or fixed electrode, as well as one or more sensors for detecting the presence of myocardium, and/or to detect electrical signals in the myocardium. In accordance with further implementations, the markers 141 and/or the anchor can be electrodes that provide a return path for electrical current that is supplied by supply electrode(s) defined in the distal region or near or at the distal end of catheter 130. If so equipped, tether 140 can include a conductive core, such as if tether 140 comprises an electrically conductive insulated tether. Anchor 150 and/or markers 141 can be in electrical communication with the conductive core of the tether 140 to provide a return path for the electrical current. In any implementation herein, a separate catheter, such as a pigtail catheter, can be provided an introduced alongside the system (e.g., 100) to provide a return electrode to provide a return path for electrical current and/or to control the direction of the flow of electrical current in a region of interest where a procedure is being performed on tissue of a patient. The cutting electrode and the return electrode are preferably moved together in tandem. The return electrode preferably has an enlarged surface area to reduce the current density at the surface electrode and to reduce ohmic heating of surrounding tissue to reduce or prevent undesired ablation and thermal effects.

In further accordance with the disclosure, the electrodes (e.g. supply, return, sensing, and the like) used in the various embodiments disclosed herein can have any desired length or shape, and if desired, can have exposed lengths that can be varied, such as by extending an exposed portion of an electrode outwardly through a port defined in an electrically insulating tubular member. The electrodes can have shapes or surface features configured to concentrate electrical charge and current density as desired. The catheters can be configured to direct flush fluid over or adjacent to electrodes to help aid in cooling the electrodes, and to help avoid the clotting of blood, and to enhance cutting, where appropriate. Any embodiment disclosed herein can be operated in a monopolar mode, or a bipolar mode, as desired, wherein the return electrode can be built into the catheter or an adjacent (e.g., pigtail) catheter to provide a return path for electrical flow.

In some aspects, the disclosure provides sensing catheters, and/or sensing catheters that can perform additional operations such as cutting. For example, the disclosure provides implementations of a medical device having an elongate body having a proximal end and a distal end, and an elongate tether operably coupled to the elongate body. The elongate tether and elongate body are configured to be longitudinally displaceable with respect to one another. The device further includes an electrode disposed on at least one of the elongate body and elongate tether, and electrical circuitry operably coupled to the electrode, wherein the electrical circuitry is configured to determine a state of at least one of the medical device and the anatomical tissue.

In accordance with further aspects, the electrical circuitry, which can include one or more analog and/or digital circuit components, such as programmable processor programmed with machine readable code, which may be contained in a memory or other non-transient medium, can be configured or programmed to carry out the functions of the circuitry, wherein the term circuitry is intended to encompass analog and/or digital circuitry. In some implementations, the circuitry can detect an incoming signal from the anatomical tissue to confirm that the electrode (e.g., 137, 141) is in physical contact with the anatomical tissue. The incoming signal from the anatomical tissue can include an electrocardiogram signal from cardiac tissue. In further implementations, the electrical circuitry can be configured to detect a voltage or current drop across the electrode after electrical power has been applied to the electrode.

In some implementations, the electrode(s) can be configured to cut tissue when energized, and relative longitudinal movement of the elongate tether and the elongate body can cause the electrode to cut through anatomical tissue that the device is placed adjacent to when the electrode is energized. In such applications, if desired, the electrical circuitry can be configured to correlate the voltage or current drop with a physical state, such as (i) a state of tissue being cut by the electrode, and a state of fouling of the electrode. If desired, such a system may further include a one or more pressure sensors located proximate the electrode. The pressure sensor can be operably coupled to the circuitry, for example. The processor can be programmed, for example, to determine at least one biological parameter based on receiving a signal from the pressure sensor, such as blood pressure or other parameters. The pressure sensor can include any suitable pressure sensor, such as a fiber optic pressure sensor having a distal crystal configured to direct light out of the distal crystal. The characteristics (e.g., wavelength or frequency) of the reflected light can permit computation or estimation of a local fluid pressure. Such a fiber optic sensor may be slidably received within the system (e.g., 100) and may be deployed to a target location to measure local pressure. Such a blood pressure probe may have one or more visualization markers to facilitate visualization of the blood pressure sensor under an imaging modality. In another implementation, a pressure tap (opening) can be located at a desired location (e.g., a side port or distal opening of a catheter) that is in communication with a passageway through the device (e.g., 100) to an external pressure sensor, wherein static pressure at a predetermined location (e.g., a side port or distal opening of a catheter) can be measured. A pressure sensor can be deployed to help a user understand if a catheter is located distally beyond the aortic valve and is within the left ventricle of a patient. Such a sensor can also help a user appreciate whether or not an electrode is proximal a node, such as the SA or AV node, to avoid inadvertently delivering electrical current to a node.

The system, if utilizing one or more electrosurgical cutting electrodes can operate in a monopolar state of operation, wherein the electrode(s) are supply electrodes, and the return path of the current to the electrosurgical generator is through the patient by way of a conductive pad attached to the patient. Alternatively, the system can operate in a bipolar mode of operation wherein one or more electrodes can be supply electrodes and one or more electrodes can be return electrodes such that the electricity only need to pass from a supply electrode to a return electrode to complete a circuit. Suitable electrical supply and return conductors can be provided extending through additional lumen(s) of catheter 130 or along a core conductor (not shown) of tether 140 for example that are externalized and operably coupled to an electrosurgical generator and/or diagnostic equipment, as desired.

Figure 7A:
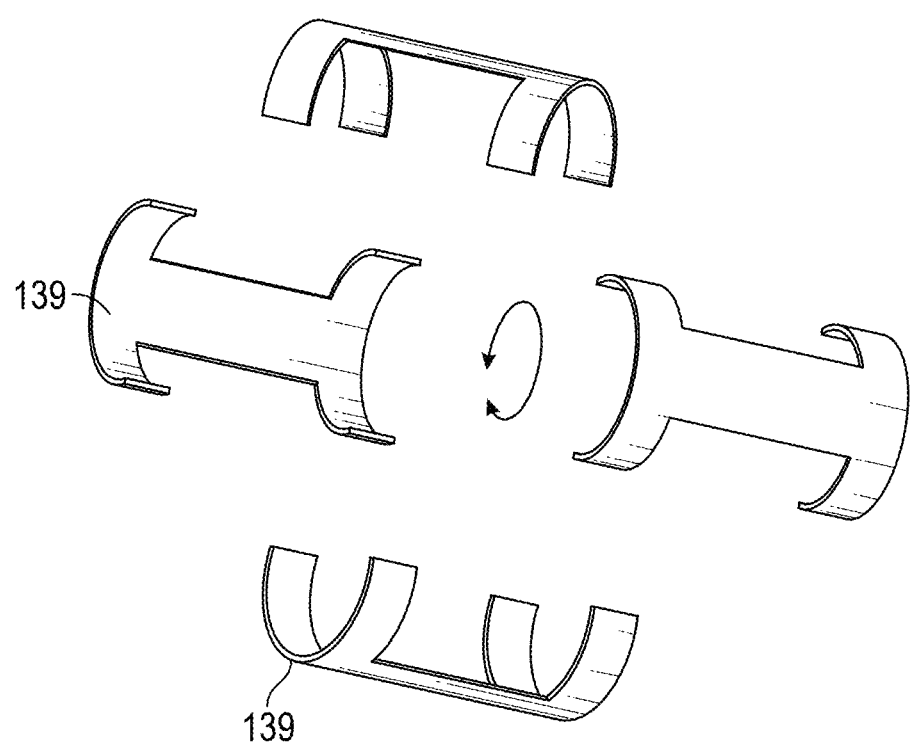
FIGS. 7A-7B illustrate features of the catheter-based system of FIG. 5 to confirm device orientation while performing a procedure in accordance with the present disclosure.
Figure 7B:
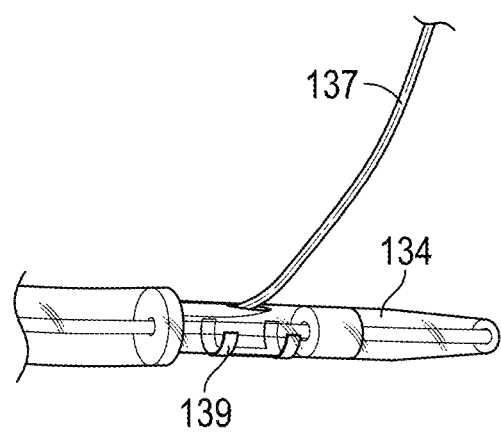

FIGS. 7A-7B illustrate features of the catheter-based system of FIG. 5 to confirm device axial and rotational orientation while performing a procedure in accordance with the present disclosure. FIG. 7A depicts a specially configured marker 139 that, when integrated into a catheter, permits a user to determine the rotational orientation of the catheter An ultrasonic transducer can be operably coupled to a cutting blade to effectuate cutting in accordance with any implementation of the present disclosure. FIG. 7B is a view of the marker 139 under fluoroscopy.

Figure 8A:
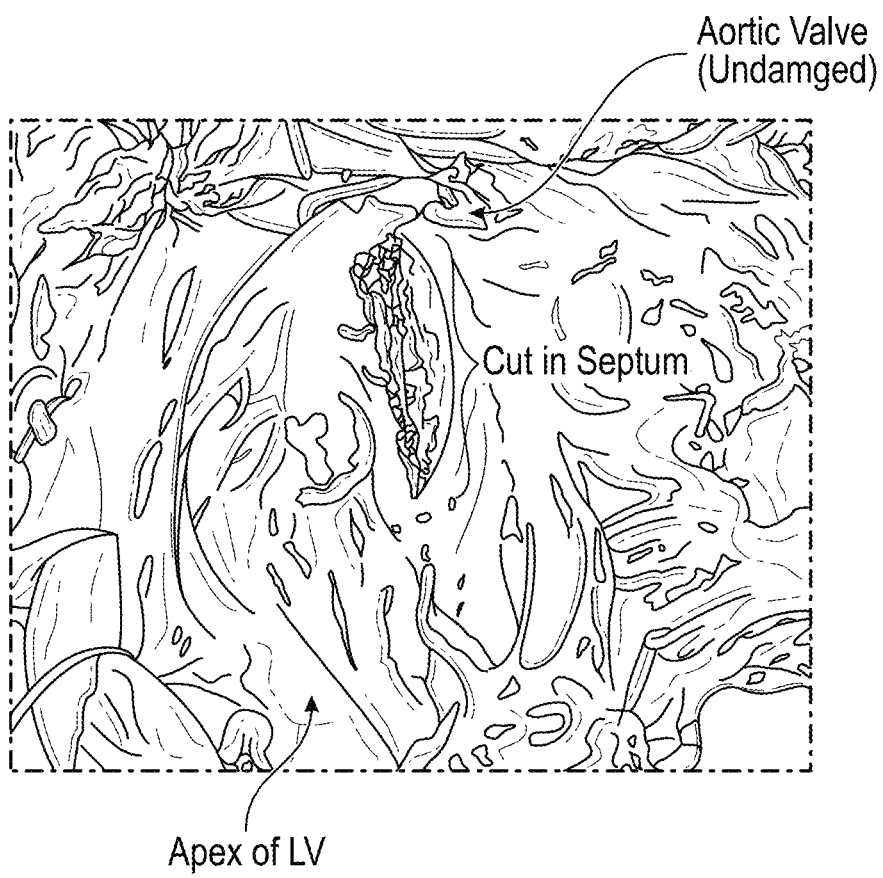
FIGS. 8A-8C illustrate results of an illustrative LVOTO treatment procedure in a porcine model in accordance with some aspects of the present disclosure.
Figure 8B:
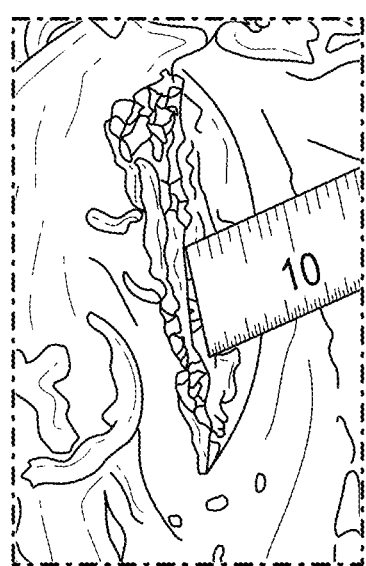
Figure 8C:
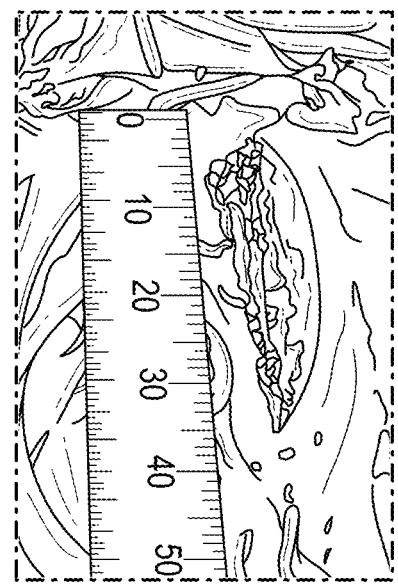
Figure 9:
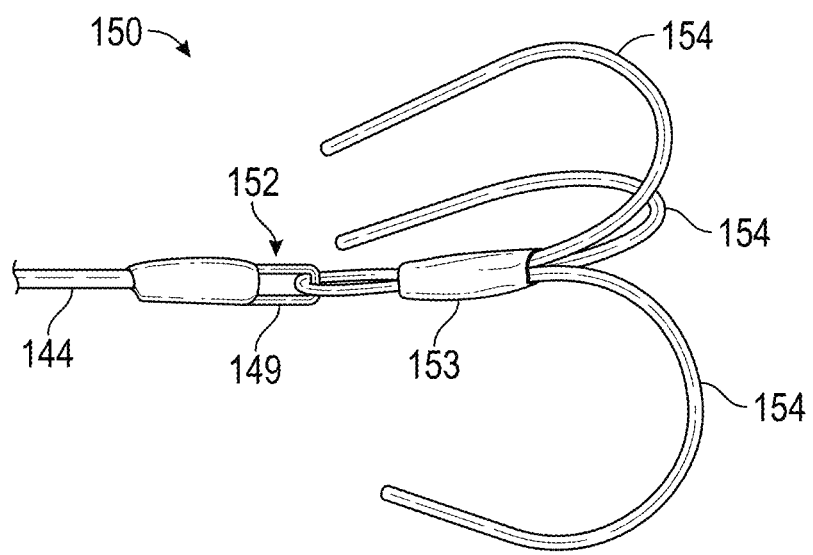
FIG. 9 is an illustrative implementation of an anchor in accordance with the present disclosure.

FIGS. 8A-8C illustrate results of an illustrative LVOTO treatment procedure in a porcine model in accordance with some aspects of the present disclosure. FIG. 8A depicts an elongate cut made in the obstruction by system 100. Also illustrated are the relative locations of the LV apex and the aortic valve, which is undamaged by the procedure. As depicted in FIG. 8B, the cut is over 5 mm deep. And, as depicted in FIG. 8C, the cut is nearly 40 mm long.

Figure 10:
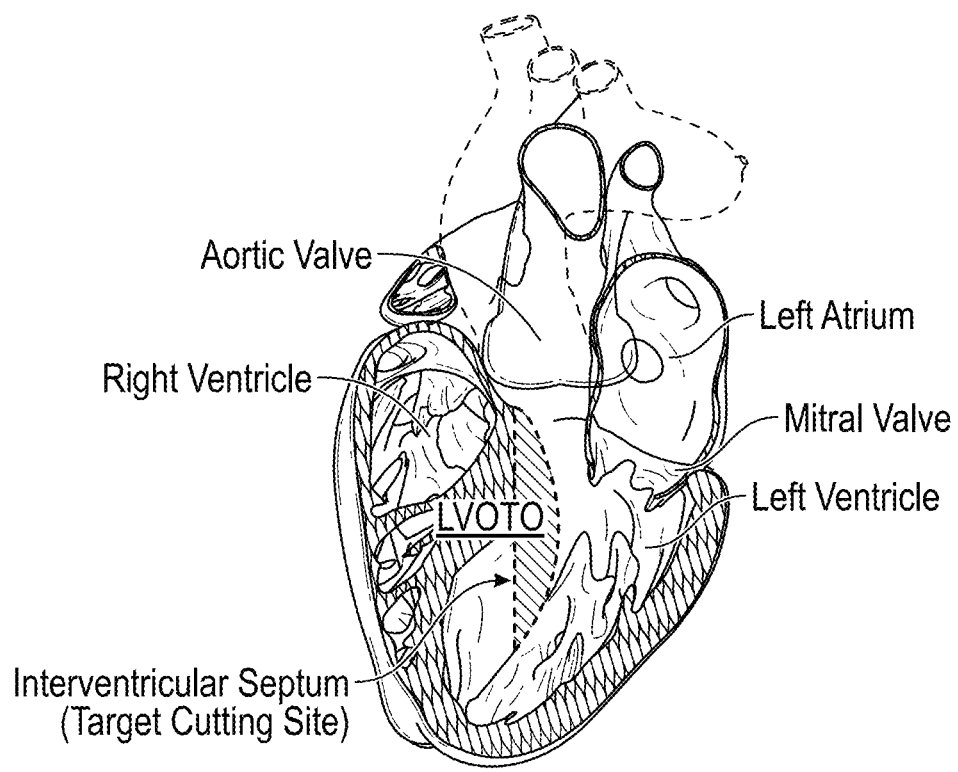
FIG. 10 is a schematic of anatomy of a heart illustrating a target cutting site for treating a LVOTO in accordance with the present disclosure.
Figure 11A:
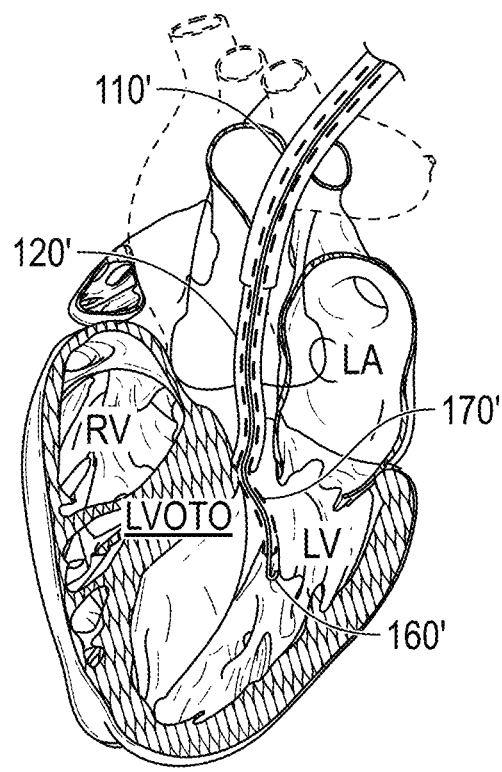
FIGS. 11A-11B are schematics illustrating aspects of introducing a system into a patient's heart to treat a LVOTO in accordance with the present disclosure.
Figure 11B:
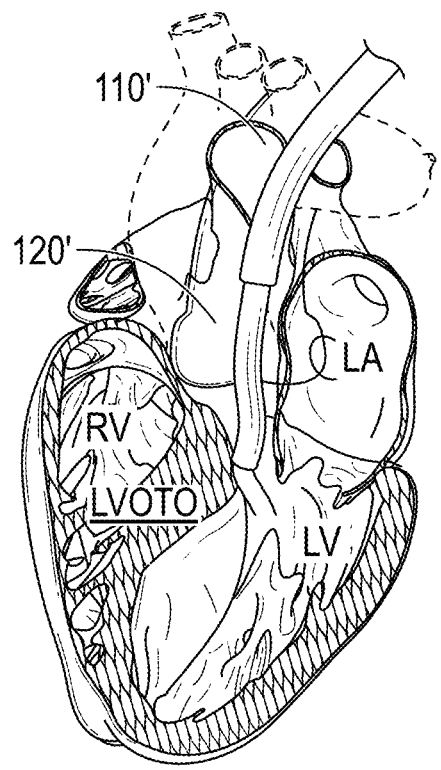

FIG. 10 is a schematic of anatomy of a heart illustrating a target cutting site for treating a LVOTO in accordance with the present disclosure. Specifically, the schematic illustrates a cross-section of the heart illustrating the relative locations of the left ventricle, right ventricle, left atrium, aortic valve, and LVOTO, indicating the boundaries of the LVOTO with respect to what would be considered a normal septal wall. FIGS. 11A-11B are schematics illustrating aspects of introducing a system into a patient's heart to treat a LVOTO in accordance with the present disclosure using a catheter having features. Specifically, a guidewire 160' is introduced into the left ventricle (e.g., a 0.035 inch wire), and a dilator catheter 170' is introduced over guidewire 160'. Catheters 110' and 120' can then be introduced over the dilation catheter 170' to deliver the distal ends of catheter 110' proximal to the aortic valve, and catheter 120' proximate the tissue mass to be cut with the system 100'

Figure 12A:
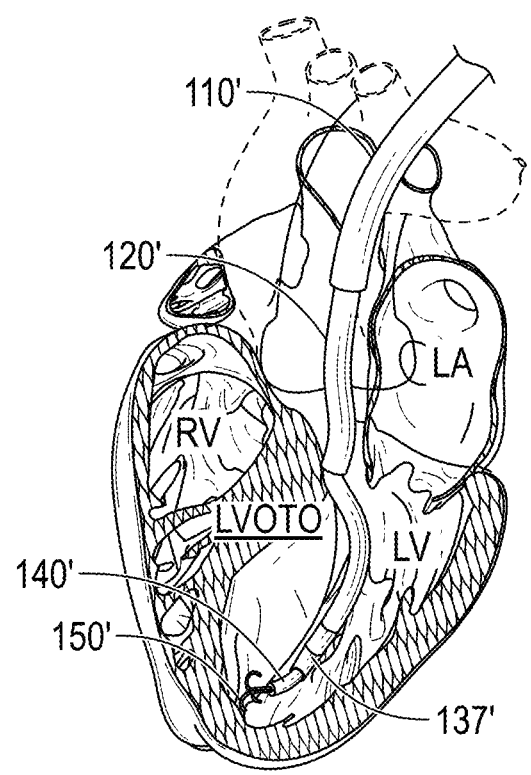
FIGS. 12A-12B are schematics illustrating further aspects of a technique to treat a LVOTO in accordance with the present disclosure including delivering an anchor to hold a treatment system in place within a patient's heart.
Figure 12B:
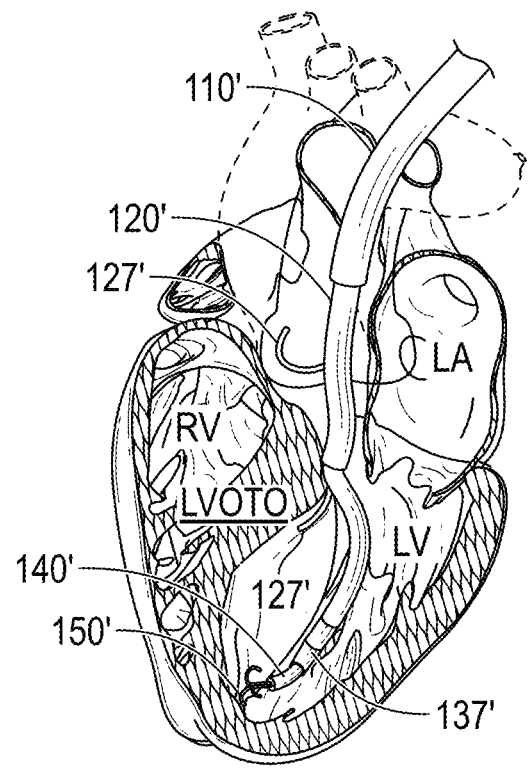

FIGS. 12A-12B are schematics illustrating further aspects of deployment of system 100'. FIG. 12A depicts anchor 150' deployed into the myocardium with the push tube 140' surrounded by the distal regions of catheters 130' and 120'. If needed, catheter 120' can be advanced to the site of the anchor 150' to support the deployment of the anchor 150'. FIG. 12B illustrates the system after the intermediate catheter 120 has been retracted proximally over the obstruction a location near the base of the obstruction at the proximal side of the obstruction, and indicating the deployment of the anchor 127' into the tissue of the mass. Also illustrated is an alternative placement of anchor 127 in the cusp of the aortic valve wherein the anchor 127' acts as a brake that pushes against the cusp of and that gets trapped to an extent in the aortic valve cusp.

Figure 13A:
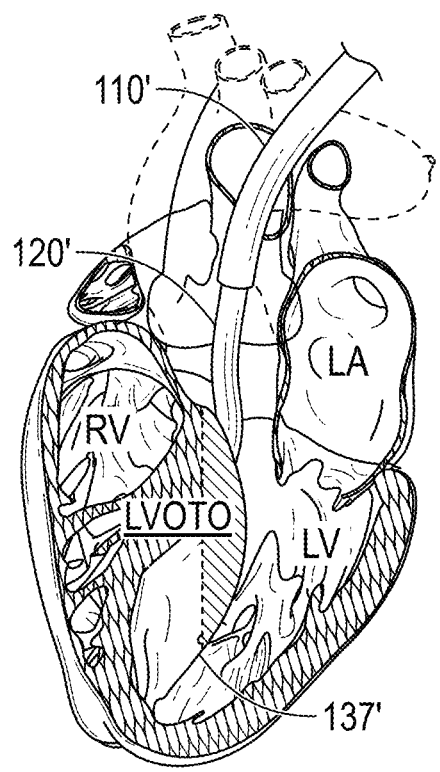
FIGS. 13A-13B are schematics illustrating further aspects of a technique to treat a LVOTO in accordance with the present disclosure including withdrawing the catheter-based system from the patient and illustrating the treated LVOTO.
Figure 13B:
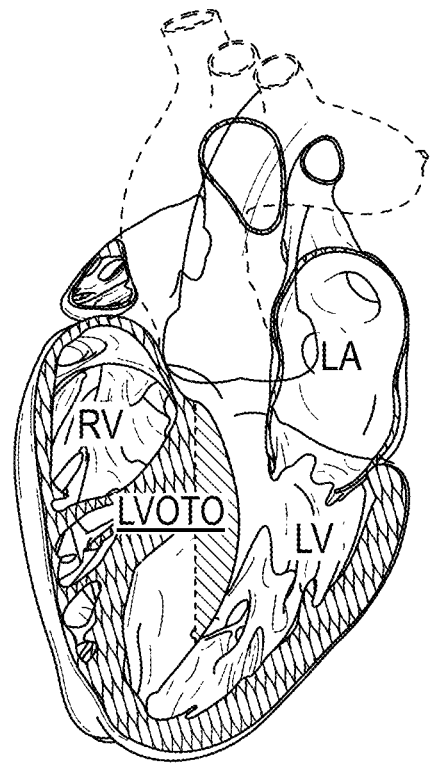

FIGS. 13A-13B depict withdrawing the catheter-based system from the patient and illustrating the treated LVOTO. FIG. 13A depicts the distal portion of the catheter system 100' as it is withdrawn from the patient's heart. FIG. 13B depicts the bottom of the cut through the LVOTO, which helps open a channel to enlarge the cross-sectional area of the LVOT. If it is desired to make the cut deeper, or to make a second cut in the tissue generally parallel to the first cut, the system 100' can be re-deployed into the left ventricle, the anchor 150' can be re-anchored in a laterally displaced location from the first site of deployment of anchor 150', and a second cut can be performed in a manner similar to the first cut.

FIGS. 14A-15C illustrate aspects of a further technique to treat a LVOTO in accordance with the present disclosure utilizing a further variation of a catheter-based system 100". System 100" incudes an inner rod or tubular member 140" that forms a main body of the system about which other system components are arranged concentrically. An intermediate anchoring catheter 120" is slidably disposed about member 140" to permit catheter 120" to slide proximally and distally over member 140". A second, distal catheter 180" is disposed distally of catheter 120" and also disposed slidably about member 140". In embodiment 100", the catheter system 100" is anchored in place at the distal base of the obstruction (e.g., an LVOTO) to hold the system in place to perform a cut along the obstruction at a location that is proximal to the anchor. As illustrated, the system 100" is deployed into the left ventricle, wherein the distal catheter 180 is advanced distally past the obstruction toward the apex of the left ventricle. The distal end region of the catheter 120" is advanced to the base of the obstruction, and an anchor wire exit port is "aimed" at the distal base of the obstruction. An anchor wire 127" is similar to anchor wire 127' can be advanced proximally into the distal base portion of the obstruction and pulled proximally into the tissue mass. In the implementation of FIGS. 14A-14C, this is effectuated by pulling outer catheter 180" proximally, which is attached to the anchor wire 127". This pushes the anchor wire 127" proximally into the tissue mass. At this point in the procedure, catheters 120" and 180" are maintained in position by the anchor wire 127". This permits tension to be applied to the system to push the catheter system against the tissue mass.

Figure 15A:
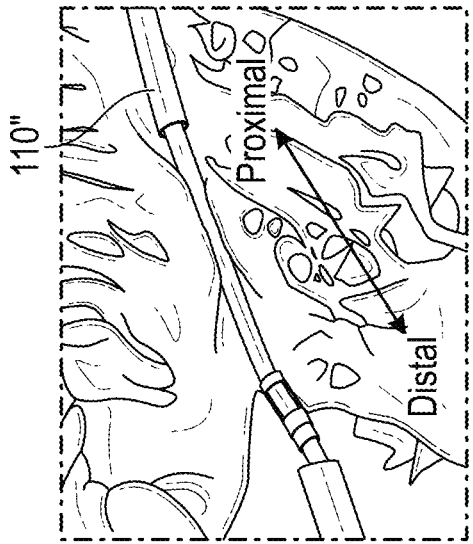
FIGS. 15A-15C illustrate aspects of yet a further method and system to cut tissue in accordance with the present disclosure utilizing a deflectable cutting catheter.
Figure 15B:
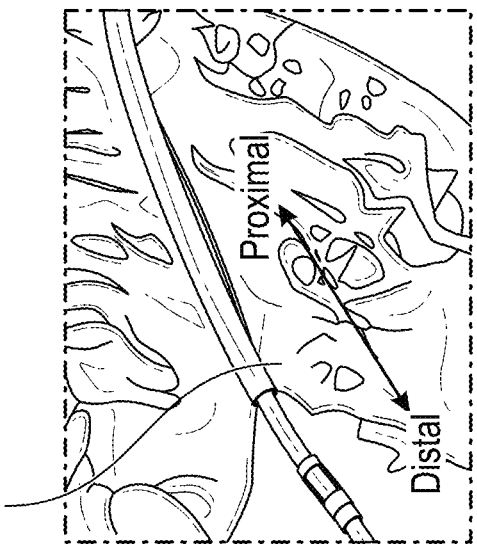
Figure 15C:
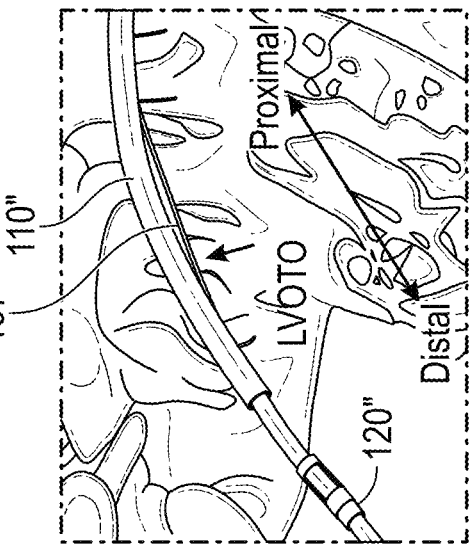

With reference to FIGS. 15A-15C, an outer catheter 110" is slidably disposed about intermediate catheter 120". An elongate cutting electrode 137" extends alongside outer catheter 110", wherein articulating, or steering the catheter 110" or applying tension to the cutting wire while the catheter 110" is bent over the tissue mass causes the electrified wire 137" to urge against the tissue. When energized, electrode 137" completes a circuit through the tissue mass in a monopolar manner, or a bipolar manner, wherein a bipolar circuit can be completed through anchor wire 127". The outer catheter 110" can be reciprocated along a proximal-distal direction over intermediate catheter 120" to complete the cutting procedure. The system 100' can then be removed by pushing catheter 180" distally over core member 140", causing the anchor wire 127" to be withdrawn into catheter 120". The system can then be removed, leaving behind the obstruction that has now been cut along its length to open the LVOT channel. While not specifically illustrated, the system components may be surrounded in a proximal location in the region of the aortic valve by an outer deflectable catheter to protect the aortic valve from electrode 137".

FIGS. 16-20B illustrate aspects of a further illustrative system 500 and associated method to cut tissue in accordance with the present disclosure.

Figure 16:
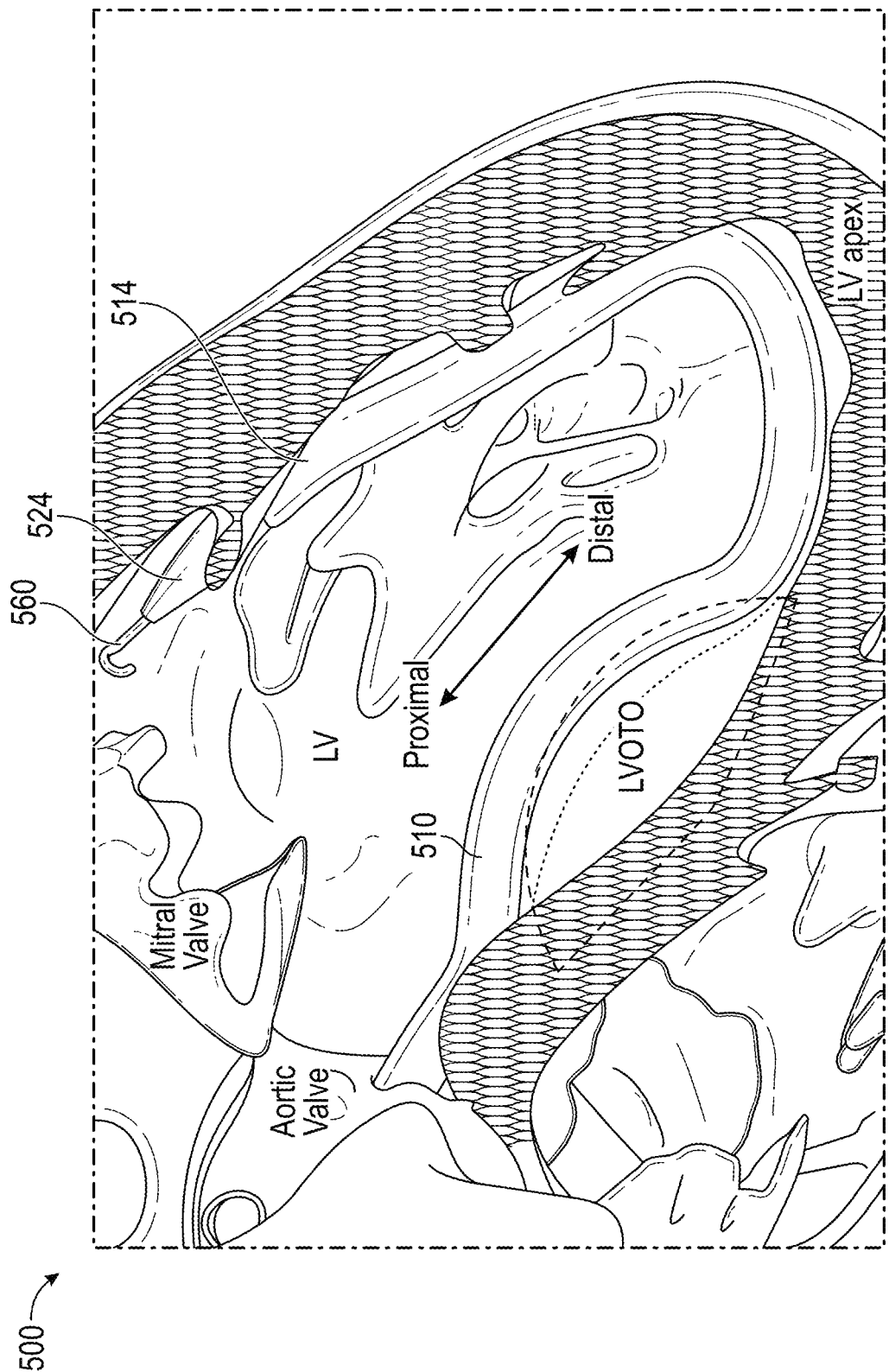
FIGS. 16-20B illustrate aspects of a further method and system to cut tissue in accordance with the present disclosure.

FIG. 16 depicts a catheter-based system encased in a sheath 500, or outer steerable catheter, that can surround the system as it is delivered to the left ventricle of a patient. The outer sheath 510 has a distal end that abuts a soft distal tip 524 of the system. The distal end of any system herein can be rounded or tapered, as desired. An inner lumen of system 500 can accommodate a guidewire 560. The guidewire 560 is first advanced to the left ventricle, and the system 500 can then be advanced over the guidewire. System 500 is sufficiently flexible to conform to the inner surface of the left ventricle as depicted in FIG. 16. The outer catheter 510 may be deflectable and/or preset with a curvature to facilitate delivery and later control of the cutting system operation, discussed in further detail below. The outer catheter 510 can be retracted proximally to a desired extent to expose a cutting wire 537, discussed in further detail below. As depicted in FIG. 16, the system 500 is situated within the left ventricle such that a primary curve is formed in the system in the apex of the left ventricle and the distal end portion of the system is situated between papillary muscles on the far wall of the ventricle. The system further conforms to and bends around an obstruction in the LVOT.

Figure 17:
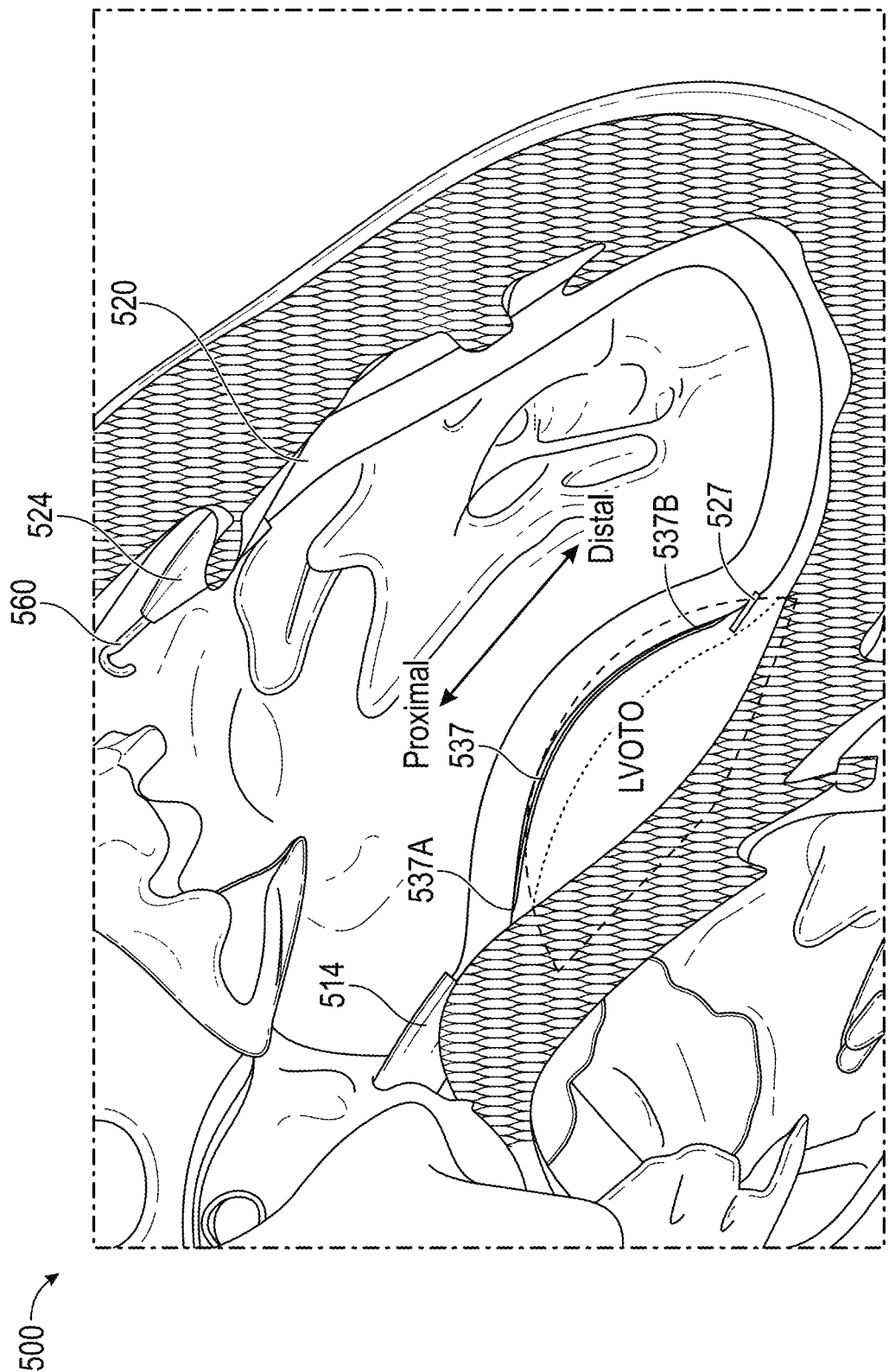

FIG. 17 depicts a further step in the procedure of using system 500 to form a cut in the LVOT. In this state, the outer sheath 510 has been retracted to the extent that the distal end 514 of the outer sheath is proximal to the tissue obstruction, but distal to the aortic valve to provide protection to the aortic valve during the cutting procedure. An inner catheter 520 is coupled to the soft distal tip 524 of the system. In addition, the inner catheter 520 defines a cutter exit port 537A and a cutter entrance port 537B that receive therethrough a reciprocating cutting element 537 therethrough. The cutting element 537 can extend distally into the body of catheter 520 through distal port 537B and be anchored at a fixed location to a rigid structure, or to an elastic structure such as a tension spring or piece of elastic. The cutting element 537 can also extend proximally into the body of catheter 520 through proximal port 537A to an actuator (not shown) that is external to the patient. When tension is applied to the cutting element 537 in a proximal direction, the cutting element is pulled proximally against the force, for example, of a tension spring (not shown) disposed within the body of the catheter 520 located distal to distal port 537B. When proximal tension is released, the cutting element 537 is pulled distally. Thus, repeated applications and removal of proximal tension to the cutting element 537 create a sawing action that cuts through the tissue either if the cutting element 537 is electrified, and/or is sharpened. Moreover, the cutting element 537 can include one or more discrete electrodes thereon that, when energized, cut through tissue as they are pulled along with the cutting element. If desired, a distal anchoring wire 527 and associated exit port 527 can be provided, wherein the anchoring wire 527 can be advanced proximally into the distal base portion of the tissue mass to help stabilize the system 500 in place. If desired, one or more radiopaque markers (not shown) can be provided at various locations on system 500, such as at the distal and 514 of the sheath, as well as at the exit port 537A, entrance port 537B, and the distal tip 524 of the system.

A variety of aspects can be used to anchor and/or stabilize system 500 in place. For example, the inner catheter 520 can be placed in the apex of the left ventricle with the distal segment against the free wall of the ventricle between the papillary muscles. This stability can be enhanced with preset curves to fit the hypertrophic cardiomyopathy (HC) or obstruction on the septum. Distal and/or proximal to the cutting target, an exit port may allow an anchoring/stabilizing element to exit the shaft, such as element 527 mentioned above. This element may include, for example, a wire that crosses the myocardium into the right ventricle, a curved element that embeds in the myocardium, or a preformed element (e.g., from a NiTi alloy) that presents as stabilizer feet. A preformed curve may be formed into body 520 in the location where it crosses over the cutting target (LVOTO) to predispose the curve to pull the distal point of the curve closer to the base of the cutting target. This can be enhanced by shortening the cutting element from the proximal handle to apply tensile force to the region of the device 520 that is distal to the entrance port 537B. The sheath 510 may be a deflectable catheter with the curve directed toward the proximal portion of the cutting target. This keeps the proximal portion of the arch close to the myocardium. The proximal sheath 510 may also help control the location of the proximal anchoring element relative to the cutting target and mechanism.

Figure 18:
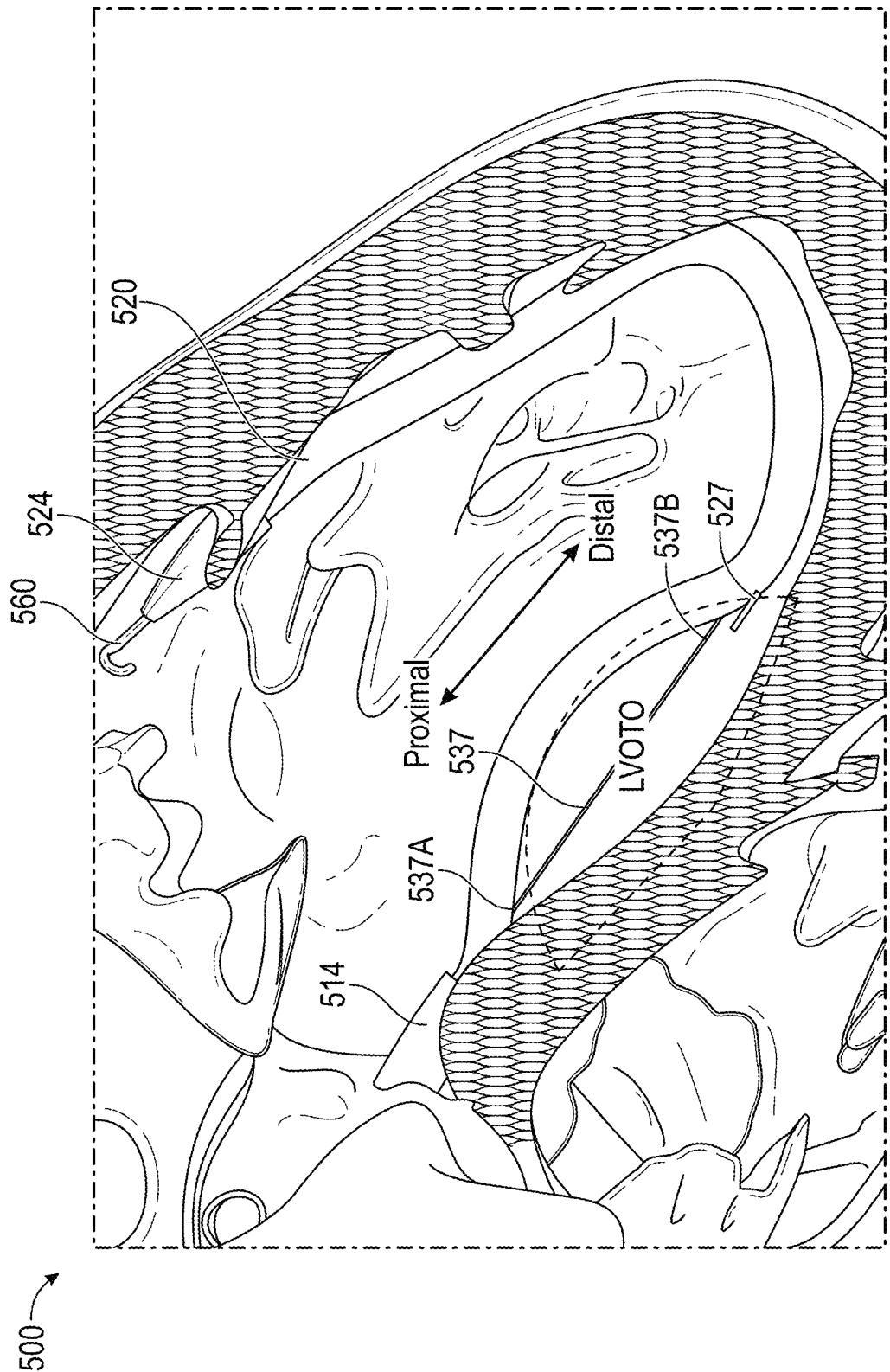

With reference to FIG. 18, the system 500 is depicted in the same side cross sectional view as FIGS. 16-17 wherein the exposed cutter 537 has penetrated tissue through various potential cutting mechanisms (e.g., reciprocating elements) that move back and forth along the tissue. A variety of reciprocating mechanisms may be used to effectuating cutting with cutting element 537. For example, as mentioned above, distally located spring disposed, for example, in body 520 may be used to return the cutting element distally after the cutter is pulled proximally. Alternatively, both ends of the cutting element 537 may be connected to a proximal tension element, wherein the cutting element or tether attached thereto reverses direction about a transition point, such as the distal entrance port 537B or a rounded boss located inside inner catheter 520 located distally to the distal entrance port 537B. Thus, both ends of the tension element coupled to the cutter 537 can be externalized and each end can be pulled alternately to effect reciprocating cutting motion. In another implementation, a proximal end of the cutter 537 can be connected to a tube or rod (not shown) located within inner catheter 520 located proximally with respect to exit port 537A that advances and retracts through inner catheter 520 the distal end of the cutter 537 is connected to a spring or other elastic element disposed within the inner catheter 520. Cutting element 537 in the region where cutting is performed may include a smooth radiopaque wire or tether, a textured radiopaque wire or tether, a diamond coated wire, a radiofrequency ("RF") wire or electrode operating in RF or microwave regimes, a length of razor wire, a cutting blade coupled to a reciprocating tether, an ultrasonic transducer or element coupled to an ultrasonic transducer, and the like.

Figure 19:
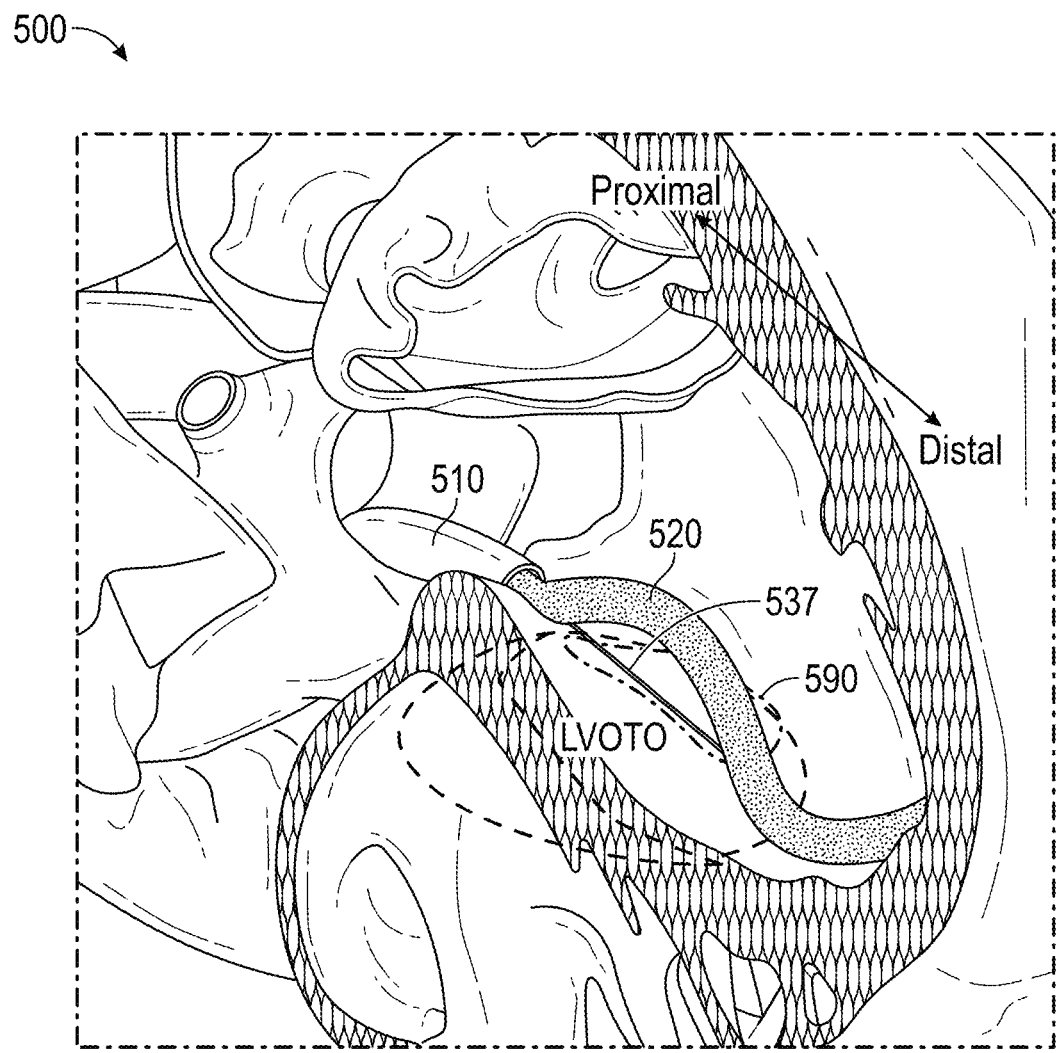

FIG. 19 depicts an isometric view of the implementations presented in FIGS. 16-18. As depicted, once cutting is complete, the tissue of the LVOTO is splayed open as defined by the perimeter 590 illustrated in FIG. 19. This splaying open of the tissue enlarges the cross-sectional area of the LVOT, thereby reducing the risks associated with implanting an artificial valve, as mentioned above. The system 500 can then be removed, for example, by advancing the sheath 510 distally over inner catheter 520 and cutter 537 to protect surrounding tissue from the cutter 537 during withdrawal. The system 500 can then be withdrawn with the guidewire 560.

Figure 20A:
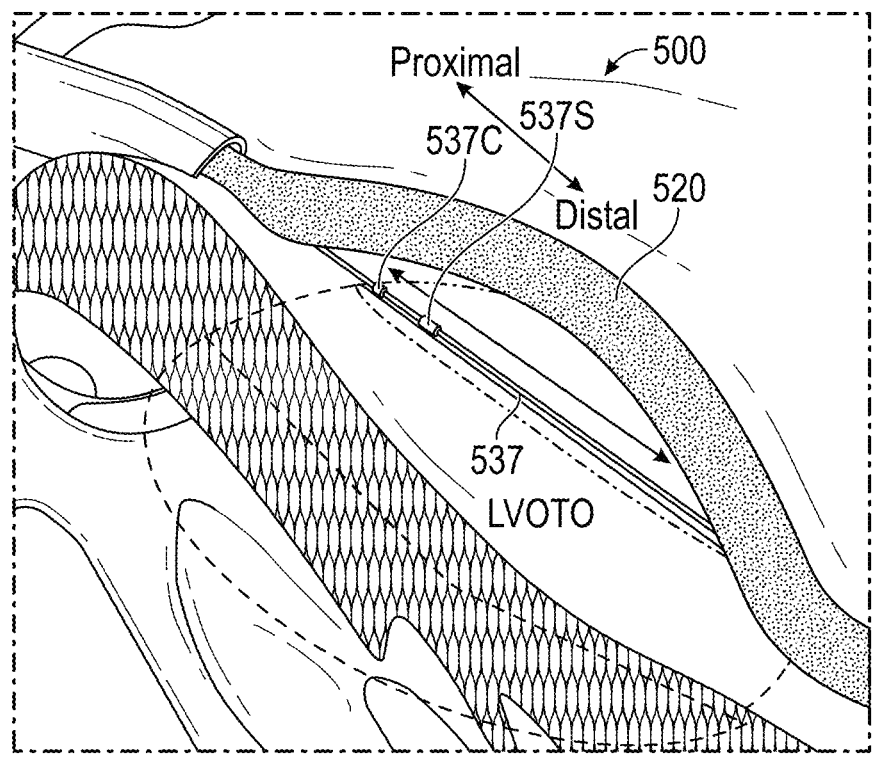
Figure 20B:
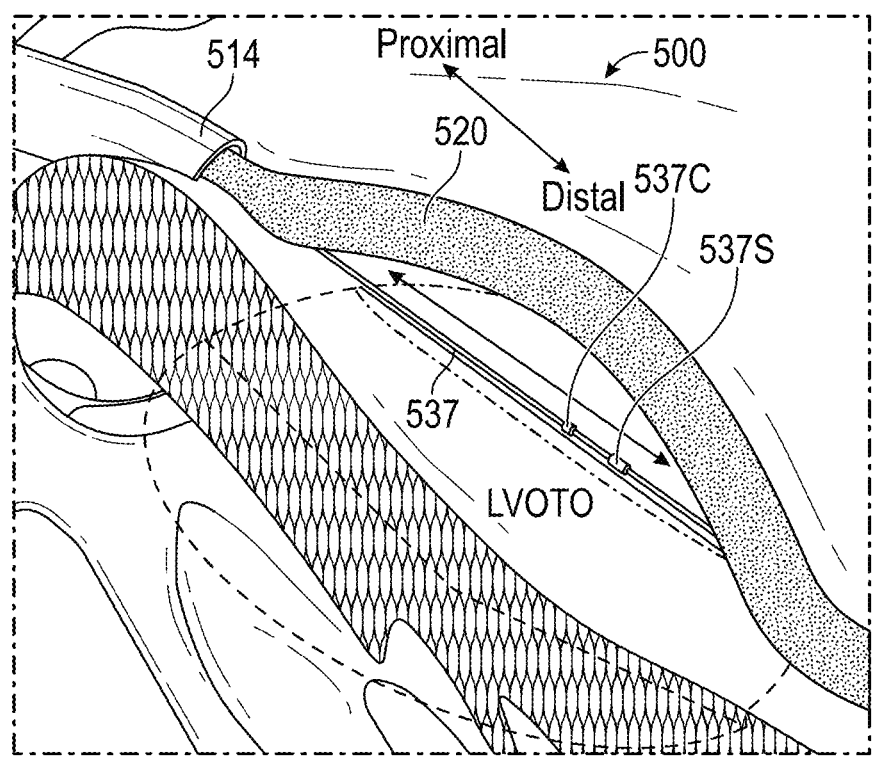

FIGS. 20A-20B depict a variation of system 500 wherein the reciprocating cutter 537 includes a first electrode 537C disposed thereon for RF cutting, and a second electrode 537S mounted thereon for EDEN (Electrocardiogramadial Depth Navigation) sensing. EDEN sensing is based on detection of an EKG signal to detect tissue depth. Each electrode 537C, 537S is electrically coupled to a conductor that may pass inside of cutter 537 and extend proximally through system 500 and out of the patient. As the cutting is being performed by electrode 537C, electrode 537S picks up EKG signals that can be used to help estimate the current depth of the cut into the myocardial tissue.

In further accordance with the disclosure, a variety of methods are provided of performing a medical procedure using the actuator assembly and catheter arrangements described herein. For example, a system of nested catheters (e.g., 110, 120, 130) can be directed or advanced to a target location inside a patient. A distal end of an outermost tubular catheter (e.g., 110) can be placed in a first location. A distal end of a further tubular catheter (e.g., 120) can be placed in a second location located distally with respect to the first location. A distal end of an inner tubular catheter (e.g., 130) can be placed in a third location located distally with respect to the second location. The method can then include performing any one or more of a variety of a therapeutic or diagnostic procedures using at least one of the catheters (e.g., 110, 120, 130).

In some implementations, a distal region of the outermost catheter (e.g., 110) can be disposed in an aortic arch of a patient, a distal region of the further tubular catheter (e.g., 120) can be disposed through a cardiac valve of a patient, and the innermost tubular catheter (e.g., 130) can be manipulated to perform a therapeutic or diagnostic procedure, such as a SESAME procedure as set forth herein. As such, the therapeutic procedure can include, in some implementations, cutting into a left ventricular outflow tract obstruction to increase the effective cross-sectional area of the left ventricular outflow tract.

The disclosure also provides an electrosurgical system including a radio frequency power supply (such as that described in U.S. Pat. No. 6,296,636, which is incorporated by reference herein in its entirety for any purpose whatsoever) operably coupled to the electrode(s) (e.g., 137, 137') and anchor, if desired (e.g., 150). The radio frequency power supply can be operably (and selectively) coupled to the electrodes by way of a cable or other conductors. Any suitable power level and duty cycle can be used in accordance with the disclosed embodiments. For example, continuous duty cycle (cutting) radiofrequency ("RF") energy can be used, for example, at a power level between about 10 and about 50 Watts, for example, or any increment therebetween of about one watt. The cuts can be made by applying power for between about one half of a second and about five seconds, or any increment therebetween of about one tenth of a second. The electrosurgery generator can be the Medtronic Force FX C Generator that achieves 5 W to 300 Watts of monopolar radiofrequency (RF) energy, for example.

Implementations of the guidewires for use with the disclosed embodiments preferably include a sterile, single use device intended to cut soft tissue. References to dimensions and other specific information herein is intended to be illustrative and non-limiting. In one implementation, the disclosed guidewire has an outer diameter of 0.035" and a working length of 260-300 cm. The proximal end of the disclosed guidewire, which has no patient contact, can be un-insulated to allow for connection to an electrosurgery generator if desired.

The devices and methods disclosed herein can be used for other procedures in an as-is condition, or can be modified as needed to suit the particular procedure. This procedure for cutting the myocardium can be used in support of a variety of procedures. Likewise, while it can be appreciated that a monopolar cutting system is disclosed, in certain implementations, it is also possible to configure the system to operate in a bipolar configuration. During the step of myocardium laceration, the system can be configured to deliver energy to the myocardium with electrosurgical pads coupled to the patient to complete the circuit. When lacerating the myocardium or other structure with the bent denuded cutting wire, most of the energy is still dissipated in the patient.

In view of the many possible embodiments to which the principles of this disclosure may be applied, it should be recognized that the illustrated embodiments are only preferred examples of the disclosure and should not be taken as limiting the scope of the disclosure.

What is claimed is:

1. A device to cut tissue, comprising:
an elongate body having a proximal end and a distal end, wherein the elongate body has a curved section that is configured to conform to and curve around a left ventricular outflow tract obstruction in a left ventricular outflow tract of a heart of a patient, and further wherein the elongate body defines a proximal exit port disposed at a location proximate a proximal region of the curved section and a distal entrance port disposed at a location proximate a distal region of the curved section;
an elongate tether operably coupled to the elongate body, wherein the elongate tether and elongate body are configured to be longitudinally displaceable with respect to one another, and wherein the elongate tether is configured to exit from the proximal exit port formed in the elongate body and re-enter the elongate body at the a distal entrance port, and further wherein the elongate tether is configured to slide through the proximal exit port and distal entrance port while under tension in a reciprocating manner while the elongate body is held stationary to cut through the left ventricular outflow tract obstruction as a proximal section of the elongate tether located proximally with respect to the proximal exit port is tensioned and untensioned; and
a cutting element disposed on the elongate tether, wherein reciprocating sliding longitudinal movement of the elongate tether through and with respect to the proximal exit port and reciprocating sliding movement through and with respect to the distal entrance port causes the cutting element to reciprocate and cut through anatomical tissue of the obstruction while the elongate body remains stationary.

2. The device of claim 1, wherein the cutting element includes at least one blade coupled to the tether that is configured to cut through tissue when the tether is reciprocated and held against the left ventricular outflow tract obstruction.

3. The device of claim 1, wherein the cutting element includes an electrically conductive element configured to be coupled to an electrical power source in order to electrify the electrically conductive element.

4. The device of claim 1, wherein the elongate body is configured to be held stationary adjacent anatomical tissue, and the at least one cutting element is disposed on the elongate tether.

5. The device of claim 4, wherein the elongate tether is configured to be received at least partially within a lumen defined in the elongate body.

6. The device of claim 1, wherein a distal end of the elongate tether is coupled to a distal portion of the elongate body by an elastic element that can stretch longitudinally, and further wherein the elastic element is configured to retract the elongate tether in a distal direction in a sliding relationship through the distal entrance port when tension is reduced on the proximal end of the tether.

7. The device of claim 6, wherein the elastic element includes a tension spring.

8. The device of claim 4, wherein the elongate tether includes a cutting electrode mounted thereon configured to be coupled to an electrosurgical power source.

9. The device of claim 8, further comprising a depth sensing electrode to sense the depth of the tissue that the elongate tether is passing through.

10. The device of claim 1, wherein the elongate body includes a flexible distal section disposed distally of the distal entrance port to conform to the anatomy of a patient's ventricle.

11. The device of claim 1, wherein the elongate tether is configured to conform to a concave surface of the curved section of the elongate body when the elongate body is placed over the obstruction.

12. The device of claim 11, wherein the elongate tether is configured to cut into the obstruction as the cutting element reciprocates until the cutting element traverses a straight path between the proximal exit port and the distal entrance port.

13. The device of claim 1, wherein the cutting element is formed at least in part from radiopaque material.

14. The device of claim 1, wherein the cutting element includes a diamond coated wire.

15. The device of claim 1, wherein the cutting element includes an ultrasonically driven cutting element.

16. The device of claim 1, wherein the curve of the curved section is preformed into the elongate body.

17. The device of claim 1, wherein the elongate body extends distally beyond the distal entrance port into an elongate preformed curved shape configured and arranged to traverse along and past an apex of a left ventricle of a patient to hold the curved section of the elongate body in place over the obstruction within the left ventricle of the patient.

18. The device of claim 1, further comprising a deployable anchor in a region of the distal entrance port of the elongate body, the deployable anchor being configured to be deployed distally of the obstruction to penetrate into the myocardium to anchor the curved section of the elongate member in place over the obstruction.

19. The device of claim 1, wherein the distal end of the tether is configured to be prevented from being removed from the distal entrance port.

* * * * *